United States Patent
Fujino et al.

(10) Patent No.: US 8,554,004 B2
(45) Date of Patent: Oct. 8, 2013

(54) DATA TRANSFORM APPARATUS

(75) Inventors: Reiko Fujino, Kawasaki (JP);
Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 393 days.

(21) Appl. No.: 13/071,023

(22) Filed: Mar. 24, 2011

(65) Prior Publication Data

US 2011/0255798 A1    Oct. 20, 2011

(30) Foreign Application Priority Data

Apr. 14, 2010  (JP) ................................ 2010-093309

(51) Int. Cl.
*G06K 9/46*    (2006.01)

(52) U.S. Cl.
USPC ........................................................ 382/248

(58) Field of Classification Search
USPC ........................... 382/234, 240, 248, 250, 281
See application file for complete search history.

(56) References Cited

U.S. PATENT DOCUMENTS

| 7,471,850 | B2 | 12/2008 | Srinivasan | 382/276 |
| 8,260,072 | B2 * | 9/2012 | Kajiwara et al. | 382/248 |
| 2009/0324112 | A1 * | 12/2009 | Park | 382/233 |
| 2010/0092099 | A1 * | 4/2010 | Richter | 382/244 |
| 2010/0290533 | A1 * | 11/2010 | Minagawa | 375/240.23 |

FOREIGN PATENT DOCUMENTS

| JP | 2001-078190 A | 3/2001 |
| JP | 2006-197572 A | 7/2006 |

OTHER PUBLICATIONS

Sridhar Srinivasan et al., "HD Photo: A new image coding technology for digital photography", Proc. of SPIE vol. 6696, 66960A (2007).
German Office Action dated Nov. 23, 2011 from counterpart application No. 10 2011 007311.6, and English translation thereof.

* cited by examiner

*Primary Examiner* — Phuoc Tran
(74) *Attorney, Agent, or Firm* — Fitzpatrick, Cella, Harper & Scinto

(57) ABSTRACT

This invention decreases the count of access to a memory which stores image data regarding orthogonal transform, and quickly generates orthogonal transform coefficients. An apparatus includes a storage unit which stores image data, a memory controller which reads each block from the storage unit, a first transforming unit which receives and orthogonally transforms the input block, and calculates only one DC component, a selector which selects and outputs one of the block read out via the memory controller, and data of DC components from the first transforming unit that are equal in number to pixels included in the block, a second transforming unit which orthogonally transforms data that have been output from the selector and are equal in number to pixels included in the block, and outputs either one DC component or a plurality of AC components, and a controller which controls the memory controller, selector, and second transforming unit.

16 Claims, 14 Drawing Sheets

DATA TRANSFORM APPARATUS

BACKGROUND OF THE INVENTION

1. Field of the Invention

The present invention relates to an orthogonal transform technique when encoding image data.

2. Description of the Related Art

Recently, the advance of sensors, display devices, and editing tools has led to a growing number of HDR (High Dynamic Range) images where more than eight bits express one color component. Further, the resolution has increased to so-called high vision or super high vision in which the number of pixels per frame is 4K×2K or 8K×4K. As a result, the image data amount becomes very large. To save such image data or transfer it within a short time, a compression encoding technique (for example, Japanese Patent Laid-Open No. 2001-78190) is indispensable.

A standard method to efficiently compress HDR high-resolution image data is "JPEG XR" (for example, Japanese Patent Laid-Open No. 2006-197572). JPEG XR is defined as image data that is formed from a plurality of tiles and one tile that is formed from a plurality of MBs (Macro Blocks). A JPEG XR stream is formed from encoded data of a plurality of tiles. As array formats for encoded data of a lower layer in encoded data of one tile, JPEG XR defines two, spatial and frequency modes.

The spatial mode is a data structure where encoded data of MBs within a tile are aligned in the raster order for each macroblock. The stream of each MB is formed from a DC coefficient stream, LP coefficient stream, and HP coefficient stream in the order named (see FIG. 7B).

To the contrary, the frequency mode is a data structure in which encoded data of a tile are aligned for each coefficient layer (DC, LP, or HP). More specifically, in the stream in the frequency mode, packets are formed from the DC coefficient streams of respective MBs, and packets formed from the LP coefficient streams follow. Then, packets formed from the streams of upper bits of HP coefficients follow, and finally, packets formed from the streams of lower bits (FLEX) of the HP coefficients follow (see FIG. 7A). Note that details of the DC, LP, and HP coefficients in JPEG XR will be explained in the processing sequence of orthogonal transform processing to be described later.

JPEG XR encoding processing includes pre-processes such as color conversion and sub-sampling, orthogonal transform, quantization, coefficient prediction, and entropy encoding in the order named (see FIG. 9). In entropy encoding, a coefficient prediction error is separated into upper and lower bits so that the number of generated significant data (nonzero) to undergo variable length coding is made equal between MBs. The upper bits of the coefficient prediction error undergo variable length coding, outputting a code to a stream. The lower bits are directly output as fixed length data to the stream without performing variable length coding.

JPEG XR encoding processing is executed for each macroblock (MB) made up of 16×16 pixels. At this time, orthogonal transform is done for a small block of 4×4 pixels. In JPEG XR, this orthogonal transform is called PCT transform. PCT transform for one small block generates one small-block DC coefficient (HPdc to be described later) and 15 AC coefficients (HP coefficients). One macroblock includes 4×4 small blocks. Hence, 4×4 small-block DC coefficients and 4×4×15 (=240) AC coefficients are calculated from one macroblock. The latter AC coefficient is the "HP coefficient" described above.

Then, PCT transform is performed again for 4×4 small-block DC coefficients, obtaining one DC coefficient and 15 AC coefficients. The former is the "DC coefficient" of the macroblock, and the latter is the "LP coefficient" of the macroblock.

FIG. 2 shows a conceivable arrangement for performing orthogonal transform to generate a stream in the frequency mode. The operation will be explained.

An image storage unit 206 stores digital image data obtained by an image sensor or the like. After the start of encoding, a DC coefficient is calculated to generate a packet formed from a DC coefficient stream.

More specifically, the digital image data stored in the image storage unit 206 is regarded to be stored as respective tiles separated at a desired rectangular size in order to perform encoding processing. Each tile is regarded to include MBs aligned in the raster order. The MB serves as the processing unit of encoding processing (see FIG. 8A). Further, the MB is regarded to include small blocks each of 4×4 pixels (FIG. 8B). Encoding processing is done for each small block.

Image data stored in the image storage unit 206 is sent to a first transforming unit 201 via a memory controller 205.

The first transforming unit 201 is a processing unit which executes lossless orthogonal transform (PCT transform) for each small block (4×4 pixels) of the sent MB to calculate the frequency coefficients of one direct current (DC) component (HPdc) and 15 alternative current (AC) components (HPs). The obtained coefficients are sent to the memory controller 205, and written back in the image storage unit 206. Since one MB includes 4×4 small blocks, this processing is executed 16 times. After processing of the first transforming unit 201 ends for one MB, 4×4 HPdc coefficient data and 240 HP coefficient data are stored in the image storage unit 206.

To calculate a DC coefficient, the memory controller 205 reads out, from the image storage unit 206, the 4×4 HPdc coefficient data which have been written and belong to the same MB, and sends them to a second transforming unit 202.

The second transforming unit 202 performs the same frequency conversion as that of the first transforming unit 201 for the 4×4 HPdc coefficient data belonging to the same MB, calculating one DC coefficient and 15 LP coefficients. The DC coefficient calculated by the second transforming unit 202 is sent from the orthogonal transforming unit to the next processing (quantizing unit) via a selector 203. In contrast, the 15 LP coefficients are written back in the image storage unit 206 via the memory controller 205. The LP coefficients are held until the DC coefficients of all MBs within the tile are output.

After the selector 203 outputs all the DC coefficients of all MBs within the tile, the memory controller 205 reads out the "LP coefficients" of each MB from the image storage unit 206, and outputs them to the selector 203. The selector 203 sends the received "LP coefficients" from the orthogonal transforming unit to the next processing (quantizing unit).

After the selector 203 outputs all LP coefficients within the tile, the "HP coefficients" of all MBs within the tile are read out from the image storage unit 206 and output from the selector 203. The selector 203 sends the received "HP coefficients" from the orthogonal transforming unit to the next processing (quantizing unit). At this time, a data-hierarchy controller 204 controls switching of output data in the selector 203.

As is apparent from the above description, the "HP coefficient" is calculated first, and then the "DC coefficient" and "LP coefficient" are calculated for each MB during calculation in JPEG XR orthogonal transform. However, DC coefficients, LP coefficients, and HP coefficients need to be aligned in the order named in an encoded stream for one tile in the frequency mode of JPEG XR. It will be understood that the order in encoding processing differs from the order of data in the encoded stream, so LP and HP coefficients calculated in respective calculation processes need to be written back in the image storage unit 206 and rearranged so that they are output from the orthogonal transforming unit in the stream order.

As described above, when generating a stream in the frequency mode, the conventional orthogonal transform method needs to rearrange coefficients so that they are output from the orthogonal transforming unit in an order in which they form a stream. For this purpose, calculated HP and LP coefficients need to be written back in a memory such as the image storage unit.

For simplicity, assume that an image to be encoded is a monochrome image having only one color component. In JPEG XR, the maximum size of a tile which forms image data may be equal to the number of pixels of the image data. In this case, the total number of HP and LP coefficients written back in the image storage unit 206 in the frequency mode equals the number of pixels of original image data. Also, the bit width per HP coefficient is larger by 5 bits than the image sample. The number of data whose LP coefficients are written back is about 1/16 of the number of pixels of image data. Further, the bit width per LP coefficient is larger by 7 bits than the image sample.

This means that, first, the memory capacity used increases. Second, the memory read and write counts become very high, and the number of data bits in read and write increases, impairing the performance of overall encoding processing. This also raises the component cost of an apparatus equipped with encoding processing.

SUMMARY OF THE INVENTION

The present invention has been made in consideration of the above situation, and provides a technique capable of decreasing the count of access to a memory which stores image data regarding orthogonal transform, and quickly generating orthogonal transform coefficients for encoding. The present invention also provides a technique of generating orthogonal transform coefficients in a suitable order based on the frequency mode in JPEG XR.

To solve the above problem, according to first aspect of the invention, there is provided a data transform apparatus for orthogonally transforming a plurality of blocks of image data, the blocks represented by a preset number of pixels, to encode the image data, the apparatus comprising: a storage unit which stores image data to be orthogonally transformed; an access unit which reads each block from the storage unit; a first transforming unit which receives and orthogonally transforms the block in the image data that has been stored in the storage unit and read out via the access unit, and for calculates and outputs only one direct current (DC) component; a selection unit which selects and outputs one of: the block read out via the access unit, and data of DC components from the first transforming unit that are equal in number to pixels included in the block; a second transforming unit which orthogonally transforms data, output from the selection unit, that are equal in number to pixels included in the block, and outputs one of: one DC component and a plurality of alternative current (AC) components; and a control unit which controls the access unit, the selection unit, and the second transforming unit to execute one of a first setting of causing the selection unit to select a DC component from the first transforming unit, and the second transforming unit to output one DC component obtained by orthogonal transform, a second setting of causing the selection unit to select a DC component from the first transforming unit, and the second transforming unit to output a plurality of AC components obtained by orthogonal transform, and a third setting of causing the selection unit to select a block of image data read via the access unit, and the second transforming unit to output a plurality of AC components obtained by orthogonal transform.

According to the present invention, coefficients can be calculated in an order in which they form a stream, without writing back AC component coefficients in the frame memory. When the present invention is applied to orthogonal transform necessary to output coefficients in the order of layers, the memory band can be reduced, and encoding processing can be quickly performed.

Further features of the present invention will become apparent from the following description of exemplary embodiments (with reference to the attached drawings).

DESCRIPTION OF THE EMBODIMENTS

Preferred embodiments of the present invention will now be described with reference to the accompanying drawings.

As a form in which the embodiment is industrially applicable, an image processing apparatus having a function of encoding an image and a function of decoding an encoded image will be explained. Examples are a digital camera and digital camcorder. The image processing apparatus may be an apparatus which encodes an image received via a network.

Figure 5:
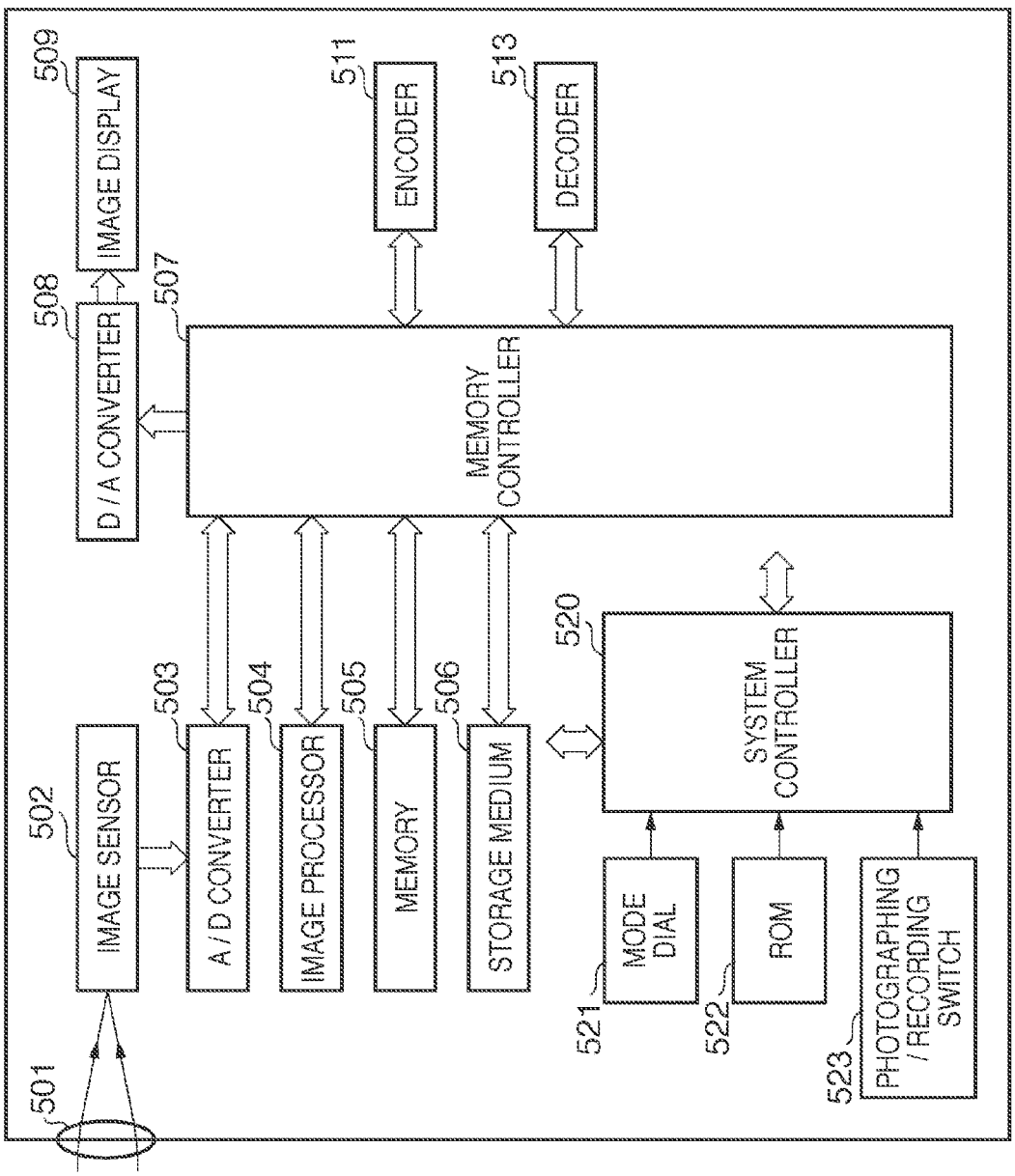
FIG. 5 is a block diagram showing a digital camera.

A digital camera having an arrangement in FIG. 5 will be exemplified. An image to be captured is formed on an image sensor 502 such as a CCD sensor or CMOS sensor via a lens 501. The image sensor 502 converts the formed image into an analog signal, and sends the analog signal to an A/D converter 503 on the subsequent stage.

The A/D converter 503 converts the analog signal received from the image sensor 502 into a digital signal. A memory controller 507 acquires the converted digital signal as data (image data) from the A/D converter 503, and sends the image data to an image processor 504. The image processor 504 performs known image interpolation processing, color conversion processing, and the like for the image data.

The memory controller 507 acquires the image data processed by the image processor 504 from the image processor 504, and stores the acquired image data in a memory 505. The memory 505 is used to temporarily store data of a captured still image or moving image, and has an area for storing a predetermined number of still images (still images by a predetermined number of frames). Since the memory 505 is a readable/writable memory, the memory controller 507 has a plurality of memory controllers dedicated to writing data in the memory 505 and a plurality of memory controllers dedicated to reading out data from the memory 505.

The memory controller 507 reads out again image data stored in the memory 505, and sends it to a D/A converter 508 and encoder 511. The D/A converter 508 converts the image data into an analog signal, and sends the converted analog signal to an image display 509. An image (captured image) indicated by the analog signal is displayed (played back) on the display screen of the image display 509.

The encoder 511 generates an encoded stream from the image data (input image) received from the memory controller 507. The memory controller 507 records the encoded stream generated by the encoder 511 on a storage medium 506. The storage medium 506 is a removable medium such as an SD card detachable from the image processing apparatus.

The digital camera has a mode dial 521 for operation by the user. The mode dial 521 is used to select either the shooting mode or playback mode. When the user operates the mode dial 521 to select the shooting mode, a system controller 520 controls the operations of respective units which form the image processing apparatus, and shooting processing can start. More specifically, the image display 509 displays an image based on image data of an image obtained via the lens 501. When the user turns on a photographing/recording switch 523 while selecting the shooting mode with the mode dial 521, shooting processing starts. More specifically, the image processing apparatus implements processing of encoding, by the encoder 511, image data of an image obtained via the lens 501, and recording it as an encoded stream on the storage medium 506.

When the user operates the mode dial 521 to select the playback mode, the system controller 520 determines an encoding mode designated by the user, controls the operations of respective units which form the image processing apparatus, and implements processes to be described below.

The memory controller 507 sequentially reads out encoded streams recorded on the storage medium 506, and sends the readout encoded streams to a decoder 513. The decoder 513 decodes the encoded streams acquired from the memory controller 507. A ROM 522 stores setting data of the image processing apparatus and a computer program to be executed by the system controller 520. Further, the ROM 522 stores data to be explained as known data in processing to be described later. More specifically, the system controller 520 executes processing using a computer program and data stored in the ROM 522, thereby controlling the operations of respective units which form the digital camera. The digital camera according to the embodiment implements encoding processing to be described later.

[Encoder 511]

Figure 9:
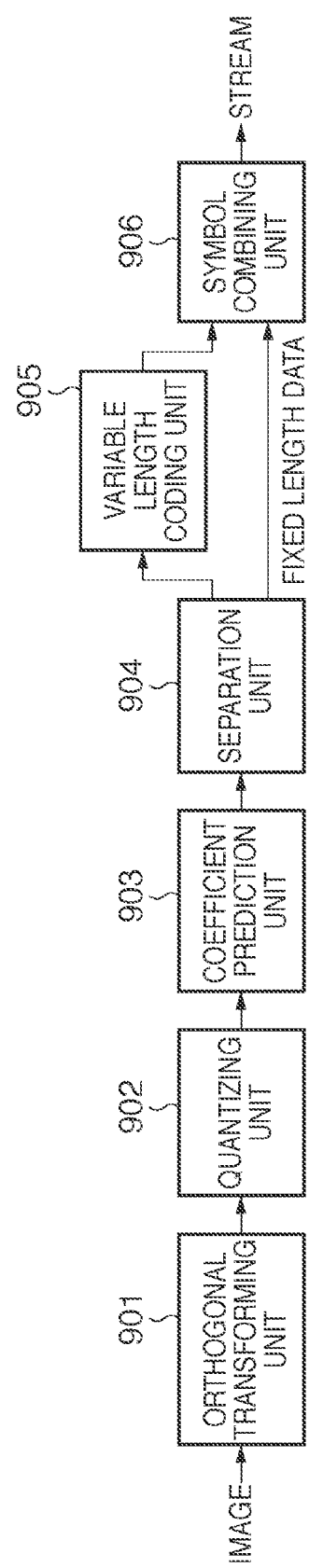
FIG. 9 is a diagram showing a JPEG XR image encoding processing sequence.

FIG. 9 is a block diagram exemplifying the detailed functional arrangement of the encoder 511 in FIG. 5. Although respective units shown in FIG. 9 are formed from hardware, part or all of them may be implemented by a computer program.

Image data input to the encoder 511 in FIG. 5 has one or more tiles. The tile contains a plurality of macroblocks (MBs) each formed from 16×16 pixels, and the respective MBs are regarded to be aligned in the raster order within the tile. One MB contains a plurality of (16) small blocks each formed from 4×4 pixels.

Image data input to the encoder 511 in FIG. 5 is sent to an orthogonal transforming unit 901. Processes in the orthogonal transforming unit 901 and subsequent units are done for each MB. Note that an encoding operation for encoding one MB will be explained, but the same operation is also executed for the remaining MBs.

The orthogonal transforming unit 901 performs orthogonal transform for image data of an acquired MB, outputting a transform coefficient in the frequency space from color space data. When transform into color space data suffices to be lossy, a quantizing unit 902 can quantize the transform coefficient to narrow the dynamic range of the transform coefficient. When the image data pattern lies across a plurality of blocks, a coefficient prediction unit 903 performs inter-coefficient prediction for the quantized transform coefficient in accordance with the layer of each frequency coefficient, further lowering the transform coefficient level. However, when the quantized value changes depending on the coefficient position within the block or the reference coefficient lies across tiles, even if the image data pattern lies across a plurality of blocks, coefficient prediction processing may be omitted. A coefficient prediction error calculated in this manner is entropy-encoded.

Next, a JPEG XR entropy encoding processing sequence will be explained.

A separation unit 904 separates a coefficient prediction error input from the coefficient prediction unit 903 into upper and lower bits. Although the upper bits undergo variable length coding, the lower bits are directly output to an encoded stream without performing variable length coding. Note that the bit position where the coefficient prediction error is causally separated is changed depending on the generation frequency of significant data (nonzero) of upper bits having undergone variable length coding in an encoded MB.

The upper bits of the coefficient prediction error input to a variable length coding unit 905 correspond to a 2D small block of 4×4 (=16) pixels. The variable length coding unit 905 scans the 2D data to rearrange it into 1D data having high encoding efficiency. Ideal rearrangement at this time is to arrange significant data forward and insignificant data (0) backward so that 0s run. The rearranged 1D data undergoes variable length coding using a run length code.

A symbol combining unit 906 combines, in a predetermined order, the obtained variable length code of the upper bits of the coefficient prediction error and the lower bits, generating an encoded stream.

By the above sequence, the encoder 511 in FIG. 5 converts an image into an encoded stream, and sends the encoded stream to the memory controller 507 in FIG. 5.

Note that a suitable method for orthogonally transforming each block is to perform lossless integer calculation at two stages and transform spatial image data in an MB into frequency coefficients of three or more layers. To simplify the following description, the encoder 511 in FIG. 5, particularly entropy encoding processing has been explained according to the JPEG XR processing sequence, but this is merely an example. Entropy encoding may be entropy encoding processing known in JPEG, MPEG, and the like.

Also, a feature of the following embodiments is an improvement of the orthogonal transforming unit 901 for generating encoded streams (frequency mode and spatial mode) with a data structure suited to JPEG XR in the encoder 511 of FIG. 5 described above.

[First Embodiment]

Figure 1:
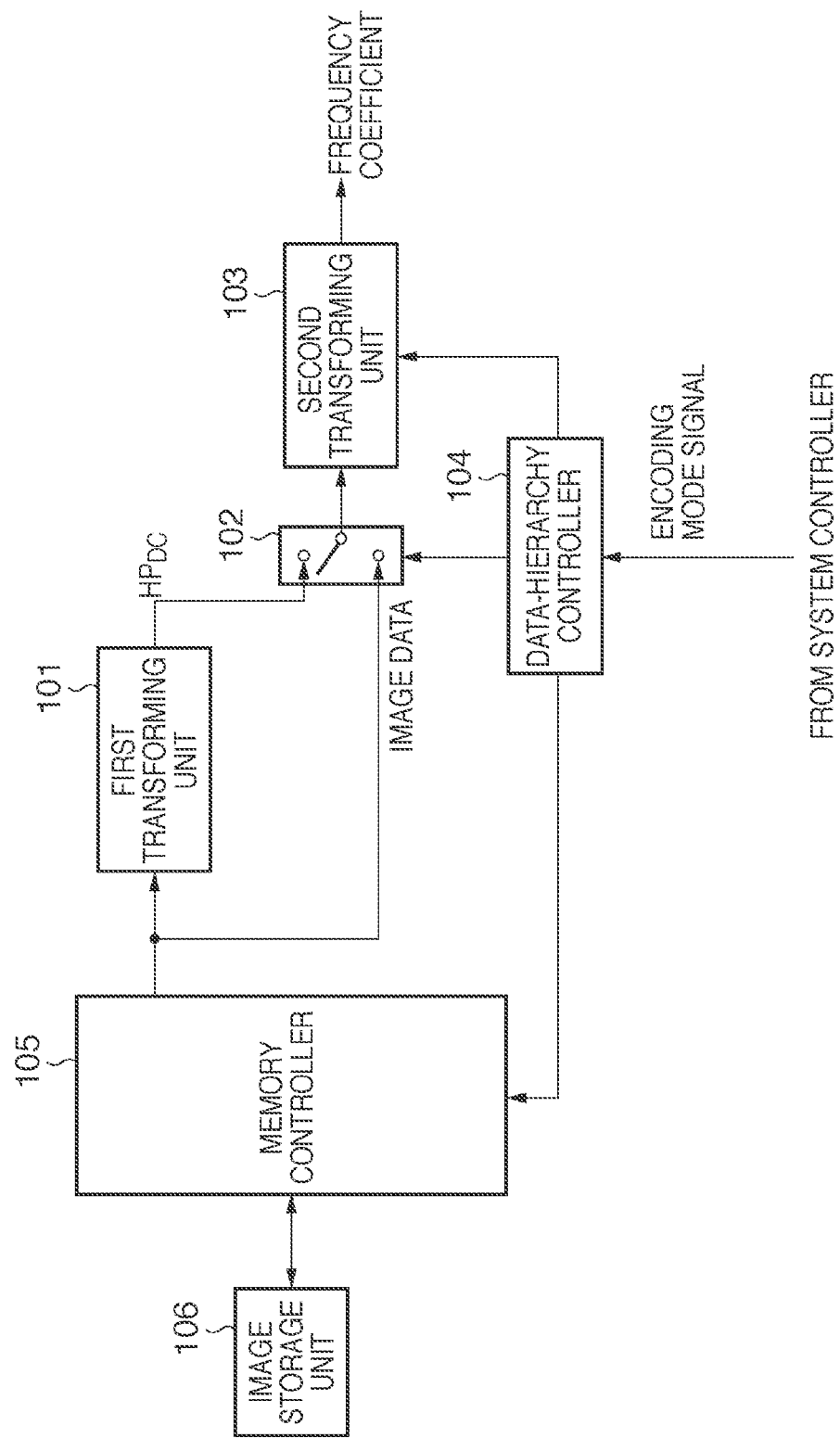
FIG. 1 is a block diagram showing an orthogonal transforming unit in the first embodiment.
Figure 2:
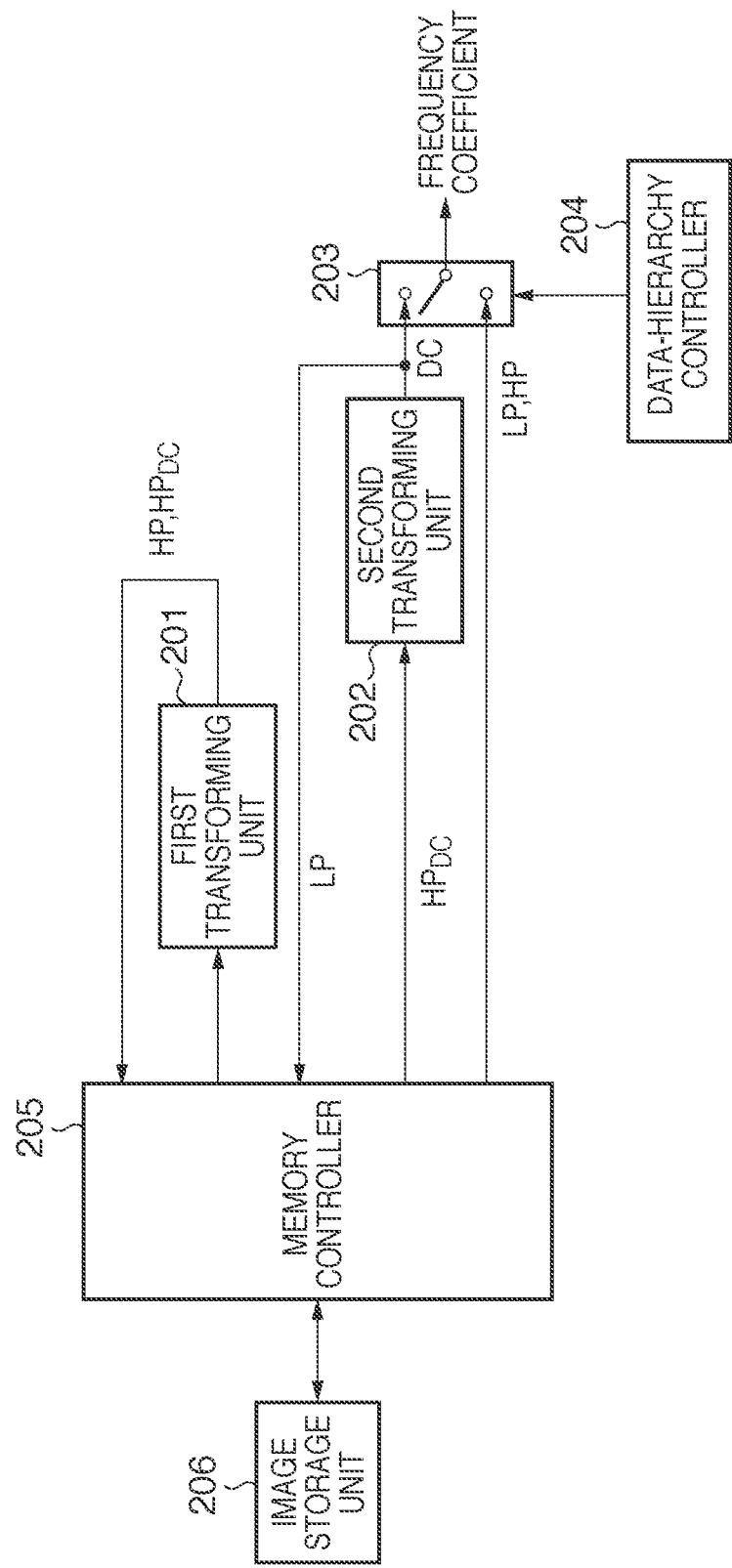
FIG. 2 is a block diagram showing an orthogonal transforming unit in the prior art.
Figure 7A:
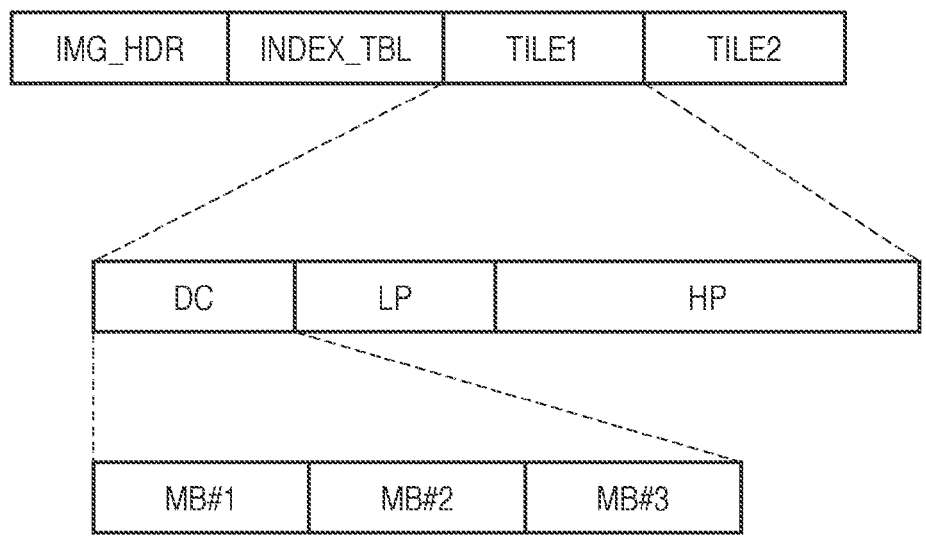
FIGS. 7A and 7B are views each showing a JPEG XR stream.
Figure 7B:
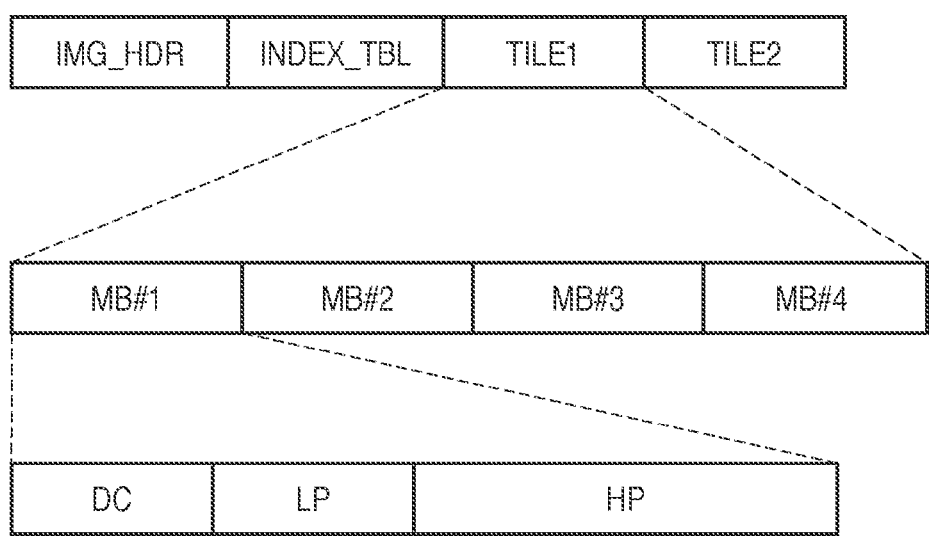
Figure 8A:
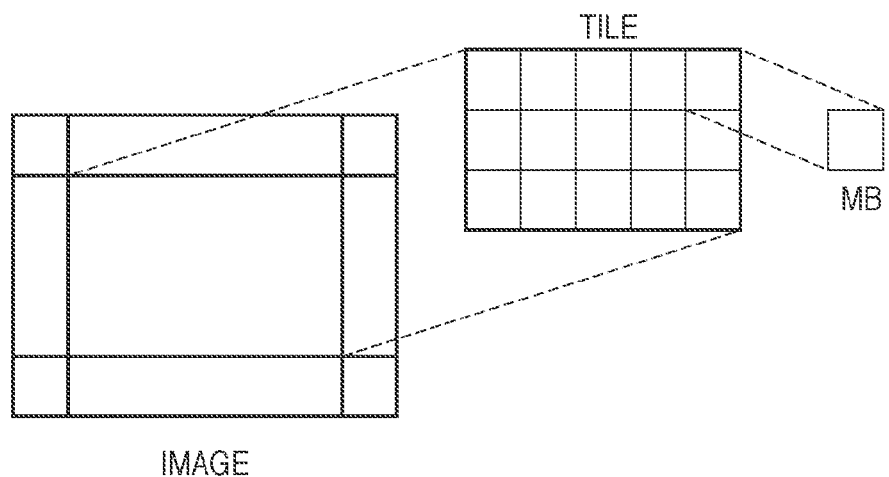
FIGS. 8A and 8B are views showing the relationship between a tile, a macroblock, and a small block.
Figure 8B:
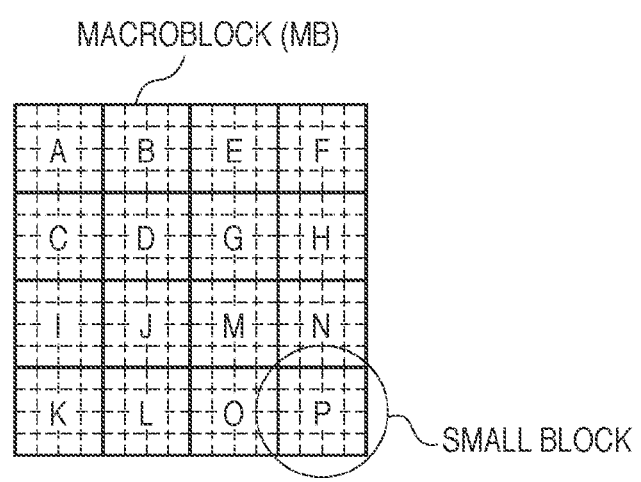

The first embodiment in the present invention will be described with reference to FIG. 1. FIG. 1 shows the arrangement of part of an orthogonal transforming unit 901 (data transform apparatus) in FIG. 9. First, the arrangement of FIG. 1 and the functions of respective building units will be explained. A case in which the embodiment is applied to the frequency mode (its encoded stream has a data structure in FIG. 7A) in JPEG XR will be explained, and the spatial mode (FIG. 7B) will be described later.

The orthogonal transforming unit 901 includes an image storage unit 106, memory controller 105, first transforming unit 101, selector 102, second transforming unit 103, and data-hierarchy controller 104. The image storage unit 106 is a memory for temporarily storing image data to be encoded. The memory controller 105 reads out an image to be encoded (to be precise, image data to be orthogonally transformed) from the image storage unit 106 for each desired block, and outputs it. The first transforming unit 101 calculates only one direct current (DC) component in lossless transform from input data of a small block of 4×4 pixels, and outputs it. That is, the first transforming unit 101 does not calculate an alternative current (AC) component. The selector 102 selects and outputs either the DC component input from the first transforming unit 101 or image data directly input from the memory controller 105 in accordance with a control signal from the data-hierarchy controller 104.

Note that the memory controller 105 in FIG. 1 corresponds to the memory controller 507 in FIG. 5, and the image storage unit 106 in FIG. 1 corresponds to the memory 505 in FIG. 5.

The second transforming unit 103 performs PCT transform serving as lossless transform for input data of a small block in accordance with a control signal from the data-hierarchy controller 104, and sends either one DC component or 15 AC components. The data-hierarchy controller 104 outputs a signal to designate output data of the selector 102 and second transforming unit 103 in synchronization with generation timings.

To generate a stream in the frequency mode in JPEG XR, the orthogonal transforming unit 901 according to the present invention outputs coefficients for each tile in the order of DC coefficients, LP coefficients (low-pass coefficients), and HP coefficients (high-pass coefficients), similar to the stream structure in the frequency mode.

An arrangement and processing sequence when encoding all DC, LP, and HP coefficients will be explained. Note that an encoding operation for encoding one MB will be described, but the same operation is also executed for the remaining MBs within the tile.

First, the memory controller 105 reads out an image to be encoded from the image storage unit 106 and sends it to the first transforming unit 101 so that the orthogonal transforming unit 901 in FIG. 9 outputs DC coefficients of one tile. The first transforming unit 101 performs transform processing for pixel data of each small block of 4×4 pixels, and calculates and outputs only one DC component. Details of the calculation method will be described later.

At this time, the data-hierarchy controller 104 outputs a control signal to the orthogonal transforming unit 901 so that the orthogonal transforming unit 901 calculates and outputs a DC coefficient. Further, the data-hierarchy controller 104 sends a selection signal to the selector 102 so that the selector 102 outputs data input from the first transforming unit 101.

The second transforming unit 103 waits until DC components equal in number to pixels within the small block are input from the first transforming unit 101 via the selector 102. Then, the second transforming unit 103 performs PCT transform, and outputs a DC component obtained by PCT transform as the "DC coefficient" of the macroblock. The calculation method of the second transforming unit 103 will also be described later.

The above processing is repeated until the DC coefficients of all macroblocks contained in the tile are output.

After outputting the DC coefficients of one tile, the orthogonal transforming unit 901 in FIG. 9 advances to processing of outputting the LP coefficients of one tile. For this purpose, the memory controller 105 in FIG. 1 reads out again the image to be encoded from the image storage unit 106 and sends it to the first transforming unit 101.

The first transforming unit 101 performs again transform processing, calculates the DC component of each small block, and sends it to the selector 102. The second transforming unit 103 waits until DC components equal in number to pixels included in the small block are acquired from the first transforming unit 101 via the selector 102. Then, the second transforming unit 103 performs PCT transform. At this time, the second transforming unit 103 calculates 15 AC components as "LP coefficients", and discards DC components obtained by this PCT transform.

Needless to say, the data-hierarchy controller 104 sends a selection signal so that the selector 102 sends data input from the first transforming unit 101 in order to send an LP coefficient. The data-hierarchy controller 104 sends a control signal to the second transforming unit 103 to output an AC coefficient. This operation is repeated until all LP coefficients within the tile are output.

Further, after outputting the LP coefficients of one tile, the orthogonal transforming unit 901 in FIG. 9 advances to processing of outputting the HP coefficients of one tile. For this purpose, the memory controller 105 reads out again the image to be encoded from the image storage unit 106. At this time, the data-hierarchy controller 104 sends a selection signal so that the selector 102 outputs, to the second transforming unit 103, image data input from the memory controller 105. The second transforming unit 103 performs PCT calculation for the acquired image data, and sends 15 calculated AC components as "HP coefficients". The data-hierarchy controller 104 sends a control signal for this purpose to the second transforming unit 103. At this time, DC components obtained by PCT calculation are discarded. This operation is repeated until all HP coefficients within the tile are output.

Note that when inserting, into a stream, FLEX serving as the lower bits of the HP coefficient in JPEG XR, it suffices to perform processing by the same sequence as the above-described HP coefficient processing sequence.

The arrangement and processing sequence for outputting all coefficients for each tile to generate a stream in the frequency mode in JPEG XR have been explained.

In the first embodiment, the memory controller 105 reads out an image (tile) to be encoded from the image storage unit 106 by the number of layers of coefficients for outputting the image to be encoded. For example, when encoding all coefficients from DC coefficients to HP coefficients, the image to be encoded is read out three times. In contrast, when encoding only DC coefficients, it suffices to perform only the DC coefficient processing sequence in the above processing sequence. That is, the memory controller 105 reads out only once an image to be encoded from the image storage unit 106. When no HP coefficient is to be encoded, that is, when only DC and LP coefficients are to be encoded, it suffices to execute only the DC coefficient processing sequence and LP coefficient processing sequence in the above processing sequence. At this time, the memory controller 105 reads out twice an image to be encoded from the image storage unit 106.

Next, the calculation methods of the first transforming unit 101 and second transforming unit 103 will be explained. For descriptive convenience, the arrangement and processing sequence of the second transforming unit 103 will be explained first.

Figure 4:
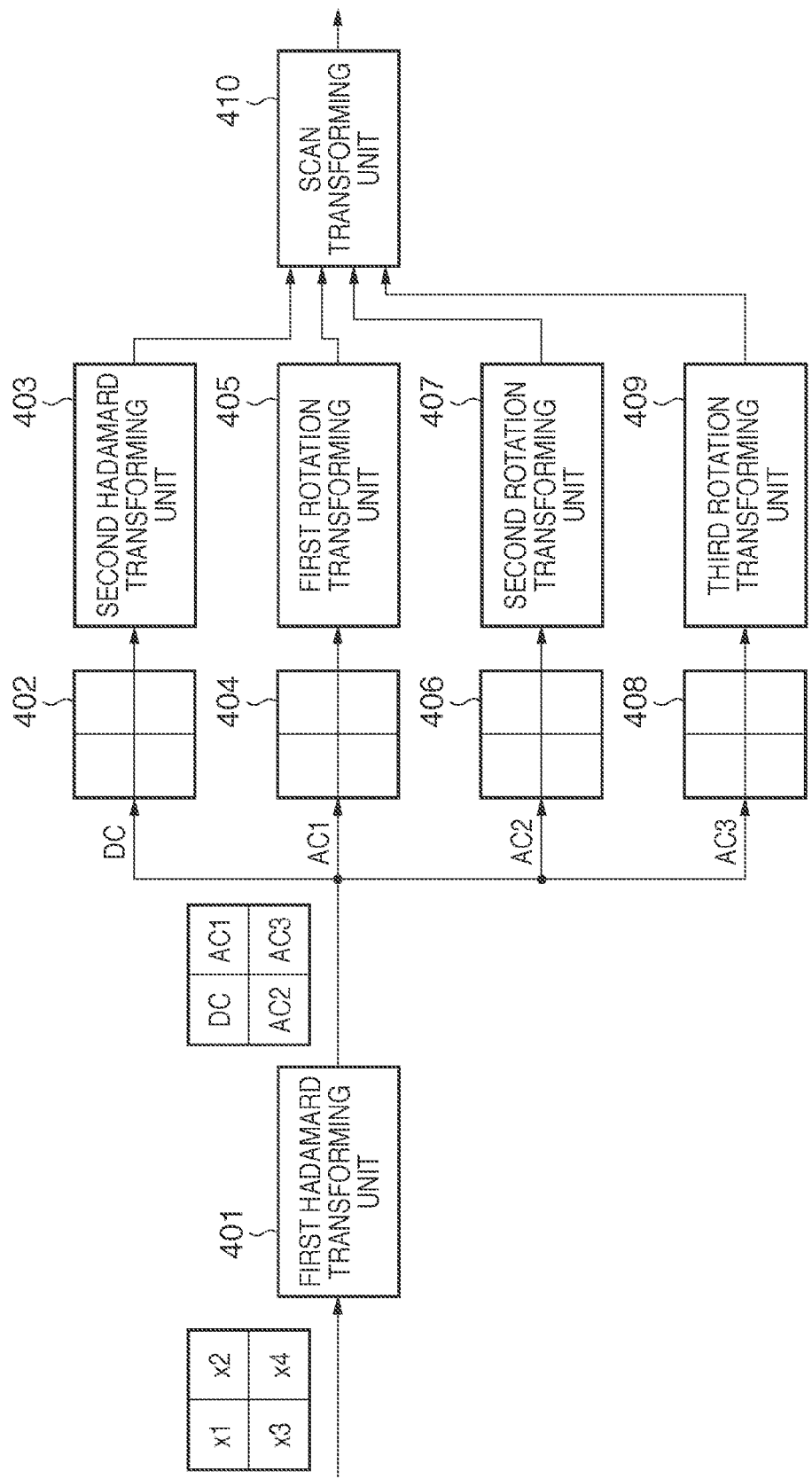
FIG. 4 is a block diagram showing the second transforming unit in the embodiment.

The arrangement of the second transforming unit 103 will be explained with reference to FIG. 4. The second transforming unit 103 sends 4×4 acquired data (small block) to a first Hadamard transforming unit 401. The first Hadamard transforming unit 401 executes lossless Hadamard transform for each sub-block formed from 2×2 data in the input small block formed from 4×4 data. Coefficients sent from the first Hadamard transforming unit 401 are stored in individual buffers depending on respective frequency bands DC, AC1, AC2, and AC3. After performing the Hadamard transform for four sub-blocks, buffers 402, 404, 406, and 408 hold the coefficients of the four sub-blocks within the small block in correspondence with the respective frequency bands. A second Hadamard transforming unit 403 executes lossless Hadamard transform again for the DC components DC of the four sub-blocks that are held in the buffer 402. A first rotation transforming unit 405 performs lossless rotation transform for the AC components AC1 of the four sub-blocks that are held in the buffer 404. Similarly, a second rotation transforming unit 407 performs lossless rotation transform for the AC components AC2 of the four sub-blocks that are held in the buffer 406. A third rotation transforming unit 409 performs lossless rotation transform for the AC components AC3 of the four sub-blocks that are held in the buffer 408.

All the processed data of the small block are sent to a scan transforming unit 410. The scan transforming unit 410 rearranges the acquired coefficients within the small block in a predetermined 2D order. By these procedures, the small block (4×4 data) undergoes PCT transform.

Figure 6:
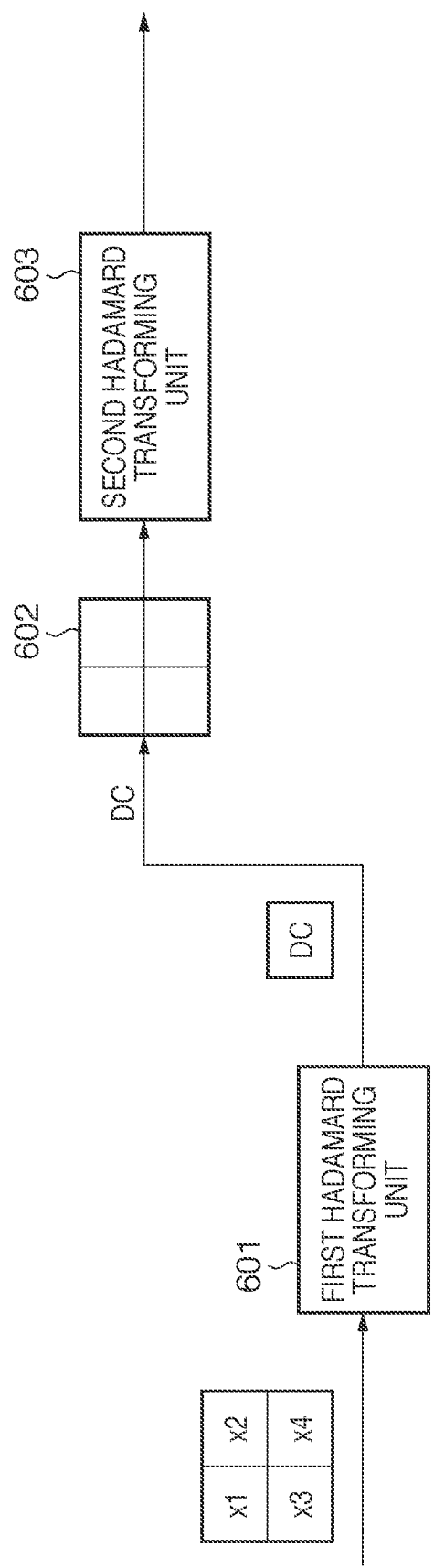
FIG. 6 is a block diagram showing the first transforming unit in the embodiment.

The arrangement of the first transforming unit 101 will be explained with reference to FIG. 6.

Similar to the second transforming unit 103, the first transforming unit 101 executes PCT transform. However, as is apparent from the above description, the first transforming unit 101 suffices to calculate only one DC component from 4×4 data, and needs not calculate an AC component. In other words, calculation regarding an AC component can be omitted, implementing high-speed calculation specialized in calculation of a DC component.

First, a first Hadamard transforming unit 601 receives a small block formed from 4×4 pixels. The first Hadamard transforming unit 601 then separates the received small block into four sub-blocks each formed from 2×2 pixels, and executes lossless Hadamard transform for each sub-block, calculating the DC component of the sub-block. More specifically, the DC component of the sub-block is calculated by dividing, by 2, the sum of 2×2 data which form the sub-block. At this time, to implement lossless Hadamard transform, the remainder of the division is rounded off.

Simple processing of dividing a given integer A by 2 and rounding off the decimal part is as follows.

(i) A parity check is done to determine whether the integer A is an odd or even number (in terms of the circuit, it suffices to utilize whether the LSB of the integer A is 0 or 1).

(ii) When the determination result reveals that the integer A is an odd number, the integer A is incremented by only "1". When the determination result reveals that the integer A is an even number, the integer A is not incremented (or 0 is added). More specifically, the LSB of the integer A is added to the integer A, updating the integer A.

(iii) The updated integer A is divided by 2, and only the integer part is output. Division by 2 suffices to simply shift a target value by only 1 bit to the lower position (shift to the right).

Since four sub-blocks exist in the input small block formed from 4×4 pixels, the first Hadamard transforming unit 601 executes the above processing four times. As a result, four (2×2) sub-block DC components are calculated. A register 602 holds the four sub-block DC components for Hadamard transform by a second Hadamard transforming unit 603.

The second Hadamard transforming unit 603 executes again 2×2 lossless Hadamard transform, calculating a DC component (small-block DC component) from the four sub-block DC components held in the register 602. More specifically, the sum of 2×2 input data is divided by 2 (shift to the right by 1 bit). At this time, the remainder of the division is rounded down to implement lossless Hadamard transform.

In the above description, the first Hadamard transforming unit 601 shifts the sum of sub-blocks to the right by 1 bit, and the second Hadamard transforming unit 603 shifts it again to the right by 1 bit. Instead, the bit shift processing may be done in one unit. Although details of this will be described later, the first Hadamard transforming unit 601 executes only (i) and (ii) described above without performing (iii). The second Hadamard transforming unit 603 then shifts the sum to the right by 2 bits (divides it by 4).

The DC component calculated by the second Hadamard transforming unit 603 is sent from the first transforming unit 101. Note that the calculation method of the first transforming unit 101 described with reference to FIG. 6 is merely an example.

In the present invention, the first transforming unit 101 suffices to be a transform processing unit which outputs only a DC component by lossless transform. The present invention does not limit the calculation method of the first transforming unit 101. In the embodiment, the size of a block to be transformed in correspondence with PCT calculation in JPEG XR is 4×4, but this is merely an example and the present invention does not limit the block size.

In this fashion, the orthogonal transforming unit in the first embodiment can quickly calculate coefficients necessary for entropy encoding without writing them back in the image storage unit in the frequency mode in which the coefficient prediction error of each layer is encoded for each tile.

In the spatial mode, it suffices to execute, for all macroblocks within the tile of interest, processing of sequentially outputting one DC coefficient, 15 LP coefficients, and 240 HP coefficients for each macroblock.

To summarize the above description, the processing sequence of the data-hierarchy controller 104 in FIG. 1 will be explained with reference to the flowcharts of FIGS. 12 to 15.

<Processing Sequence in Frequency Mode>

A system controller 520 determines an encoding mode (either the frequency mode or spatial mode) designated by the user, and supplies the determination result as a control signal to the data-hierarchy controller 104. Processing to be described below is processing by the data-hierarchy controller 104 when the signal from the system controller 520 indicates the frequency mode. The data-hierarchy controller 104 executes orthogonal transform in JPEG XR according to the flowchart of FIG. 12. In this description, the number of macroblocks (16×16 pixels each) included in one tile is N.

As will be apparent from the following description, the data-hierarchy controller 104 has three types of settings for the memory controller 105, selector 102, and second transforming unit 103.

The first is a setting of causing the selector 102 to select a DC component from the first transforming unit 101, and the second transforming unit to output a DC component (first setting). The second is a setting of causing the selector 102 to select a DC component from the first transforming unit 101, and the second transforming unit to output an AC component (second setting). The third is a setting of causing the selector 102 to select a small block from the memory controller 105, and the second transforming unit to output an AC component (third setting). In the frequency mode, transform coefficients for a tile are output at three stages. More specifically, at the first stage, the DC components of respective macroblocks contained in a tile are output. At the second stage subsequent to the first stage, the LP coefficients of the respective macroblocks contained in the tile are output. At the third stage subsequent to the second stage, the HP coefficients of the respective macroblocks contained in the tile are output. The following is a detailed processing example.

First, the data-hierarchy controller 104 initializes, to "1", a variable i which specifies a macroblock (step S1). Then, the data-hierarchy controller 104 outputs a control signal to the selector 102 to select and output data from the first transforming unit 101, and outputs a control signal to the second transforming unit 103 to output only a DC coefficient obtained by PCT transform. The data-hierarchy controller 104 outputs a control signal to the memory controller 105 to read out the ith macroblock (16×16 pixels). As a result, the first transforming unit 101 calculates the DC coefficients of 4×4 small blocks within the ith macroblock, and the second transforming unit 103 calculates the DC coefficient of the macroblock from the DC coefficients of the 4×4 small blocks, and outputs the calculated DC coefficient (step S2). The data-hierarchy controller 104 increments the variable i by only "1" (step S3), and determines whether calculation and output of the DC coefficients of all macroblocks within the tile of interest have ended (step S4). If NO in step S4, the data-hierarchy controller 104 repeats steps S2 to S4.

If calculation and output of the DC coefficients of all macroblocks within the tile of interest have ended, the data-hierarchy controller 104 initializes the variable i again to "1" (step S5). The data-hierarchy controller 104 outputs a control signal to the selector 102 to select and output data from the first transforming unit 101, and outputs a control signal to the second transforming unit 103 to output only an AC coefficient obtained by PCT transform. The data-hierarchy controller 104 outputs a control signal to the memory controller 105 to read out the ith macroblock. Accordingly, the first transforming unit 101 calculates the DC coefficients of 4×4 small blocks within the ith macroblock, and the second transforming unit 103 calculates the LP coefficient of the macroblock from the DC coefficients of the 4×4 small blocks, and outputs the calculated LP coefficient (step S6). The data-hierarchy controller 104 increments the variable i by only "1" (step S7), and determines whether calculation and output of the LP coefficients of all macroblocks within the tile of interest have ended (step S8). If NO in step S8, the data-hierarchy controller 104 repeats steps S6 to S8.

If calculation and output of the LP coefficients of all macroblocks within the tile of interest have ended, the data-hierarchy controller 104 initializes the variable i again to "1" (step S9). The data-hierarchy controller 104 outputs a control signal to the selector 102 to select and output data from the memory controller 105, and outputs a control signal to the second transforming unit 103 to output only an AC coefficient obtained by PCT transform. The data-hierarchy controller 104 outputs a control signal to the memory controller 105 to read out the ith macroblock. Hence, the second transforming unit 103 executes PCT transform for each small block of 4×4 pixels within the macroblock, and outputs 15 obtained AC components as some of HP coefficients (step S10). Since one macroblock includes 4×4 small blocks, 4×4×HP coefficients are calculated and output by this processing. After that, the data-hierarchy controller 104 increments the variable i by only "1" (step S11), and determines whether calculation and output of the HP coefficients of all macroblocks within the tile of interest have ended (step S12). If NO in step S12, the data-hierarchy controller 104 repeats steps S10 to S12; if YES, ends orthogonal transform processing for the tile of interest.

Details of step S2 described above will be explained with reference to the flowchart of FIG. 13. First, the data-hierarchy controller 104 initializes a variable j to "1" (step S21). The variable j specifies a small block (4×4 pixels) within the macroblock of interest (ith macroblock in FIG. 12). The data-hierarchy controller 104 then supplies image data of the jth small block to the first transforming unit 101, causing the first transforming unit 101 to calculate the DC coefficient of the small block (step S22).

As described above, the first transforming unit 101 has a circuit arrangement specialized in quickly calculating only a DC coefficient in PCT transform. According to JPEG XR, a small block formed from 4×4 pixels is separated into four sub-blocks each formed from 4 pixels, and Hadamard transform is done for each sub-block, calculating four sub-block DC coefficients. Further, Hadamard transform is executed again for the four obtained sub-block DC coefficients, calculating one DC coefficient for the small block.

The present inventors have found that when attention is paid to one sub-block, if the sum of data within the sub-block is an even number, a value obtained by dividing the sum by 2 equals a value indicated by sub-block DC coefficient data of the sub-block. That is, no round-off error is generated in integer lossless Hadamard transform at the first stage for the sub-block of interest. Further, the present inventors have found that if the sum of data within the sub-block of interest is an odd number, decimal data of 0.5 is added to a value obtained by dividing the sum by 2, and a value obtained by rounding up the decimal part equals the value of integer sub-block DC coefficient data compatible with JPEG XR. The present inventors have also found that an integer part obtained by dividing the sum of the DC coefficients of sub-blocks by 2 equals the DC coefficient of the small block.

Determining whether the value is an odd or even number is a parity check. From this, the present inventors have also found that, letting Data[0] to Data[15] be pixel values when a small block formed from 4×4 pixels is raster-scanned, and P0 to P3 be the parities of four sub-blocks (0 for an even number and 1 for an odd number), the target small-block DC coefficient can be calculated as follows:

sum0=Data[0]+Data[3]+Data[12]+Data[15];

sum1=Data[1]+Data[2]+Data[13]+Data[14];

sum2=Data[4]+Data[7]+Data[8]+Data[11];

sum3=Data[5]+Data[6]+Data[9]+Data[10];

P0=sum0 & 1;

P1=sum1 & 1;

P2=sum2 & 1;

P3=sum3 & 1;

sum=sum0+sum1+sum2+sum3+P0+P1+P2+P3;

$$DC=\text{sum}>>2; \qquad (1)$$

(where "&" is an operator indicating the AND of bits, "+" is an operator indicating addition, and ">>" is a bit shift operator. That is, "x>>2" sends back an integer part when x shifts to the lower position by 2 bits.)

In short, equation (1) means that the DC coefficient of a small block can be calculated by adding the parity values of respective sub-blocks to the sum of the pixel values of 4×4 pixels of the small block, dividing the sum by 4, and rounding down the decimal part. It will readily occur to those skilled in the art that the calculation of equation (1) cannot be applied to an AC component, but equation (1) can calculate the DC component DC using a much simpler circuit at higher speed, compared to PCT transform in JPEG XR. In particular, the arrangement regarding 2-bti shift is obtained by only shifting and arranging two signal lines (2 bits) of the data bus for calculated "sum". Thus, no special hardware is required, and no clock is wasted for this.

The above description is applied to FIG. 6 as follows. In the following description, four data which form a sub-block are defined as V1, V2, V3, and V4.

The first Hadamard transforming unit 601 calculates the sum Tsub (=V1+V2+V3+V4) of four received data, and outputs the calculated Tsub and a value indicating the parity of Tsub itself, that is, the LSB of Tsub.

In this case, {V1, V2, V3, V4} is one of {Data[0], Data[3], Data[12], Data[15]}, {Data[1], Data[2], Data[13], Data[14]}, {Data[4], Data[7], Data[8], Data[11]}, {Data[5], Data[6], Data[9], Data[10]}.

The second Hadamard transforming unit 603 accepts, from the first Hadamard transforming unit 601, the calculated values of the four sub-blocks and values indicating the respective parities, and calculates the sum. The second Hadamard transforming unit 603 shifts the sum to the lower position by 2 bits (divides it by 4), and outputs the integer value as the DC coefficient of the small block of interest.

Figure 13:
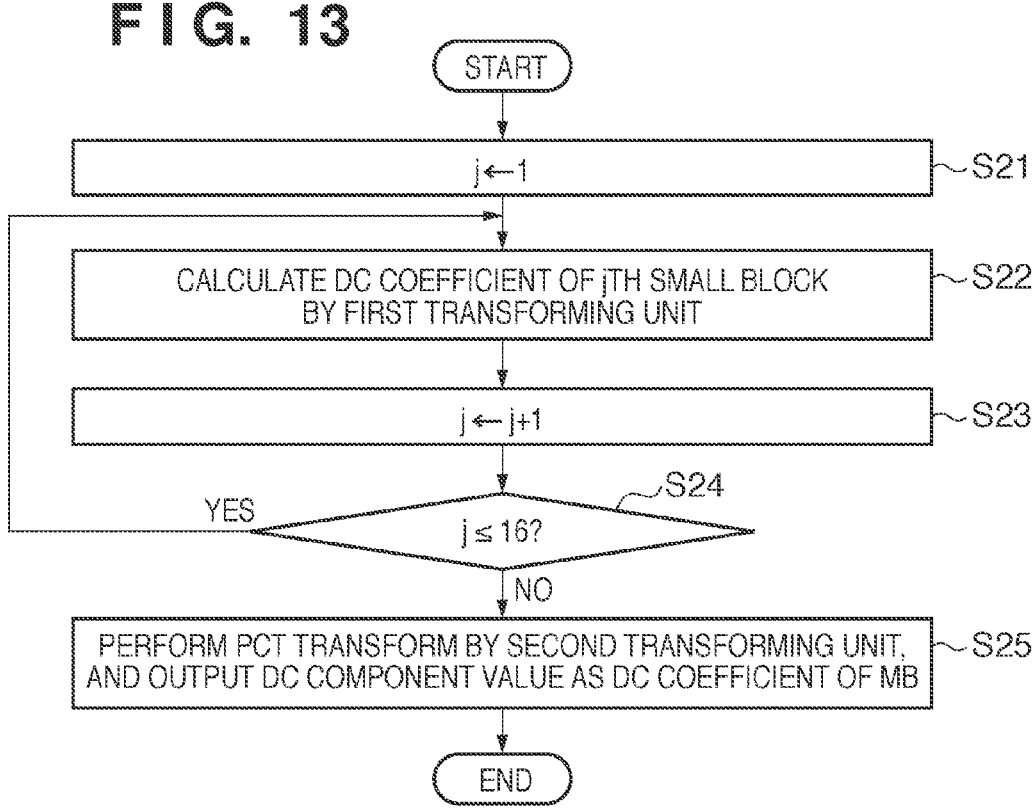
FIG. 13 is a flowchart showing processing in step S2 of FIG. 12.

Referring back to the description of the flowchart in FIG. 13, after the end of calculation and output of the DC coefficient of one small block, the data-hierarchy controller 104 increments the variable j by only "1" (step S23). One macroblock includes 4×4 small blocks. The data-hierarchy controller 104 compares the variable j with "16" to determine whether calculation and output of the DC coefficients of all small blocks within the macroblock of interest by the first transforming unit 101 have ended (step S24). If NO in step S24, the data-hierarchy controller 104 repeats steps S22 to S24. If the data-hierarchy controller 104 determines that calculation and output of the DC coefficients of all small blocks within the macroblock of interest have ended, the DC coefficients of 4×4 small blocks have been obtained. Hence, the data-hierarchy controller 104 causes the second transforming unit 103 to perform PCT transform, and outputs one DC coefficient obtained at this time as the DC coefficient of the macroblock of interest (step S25).

Figure 12:
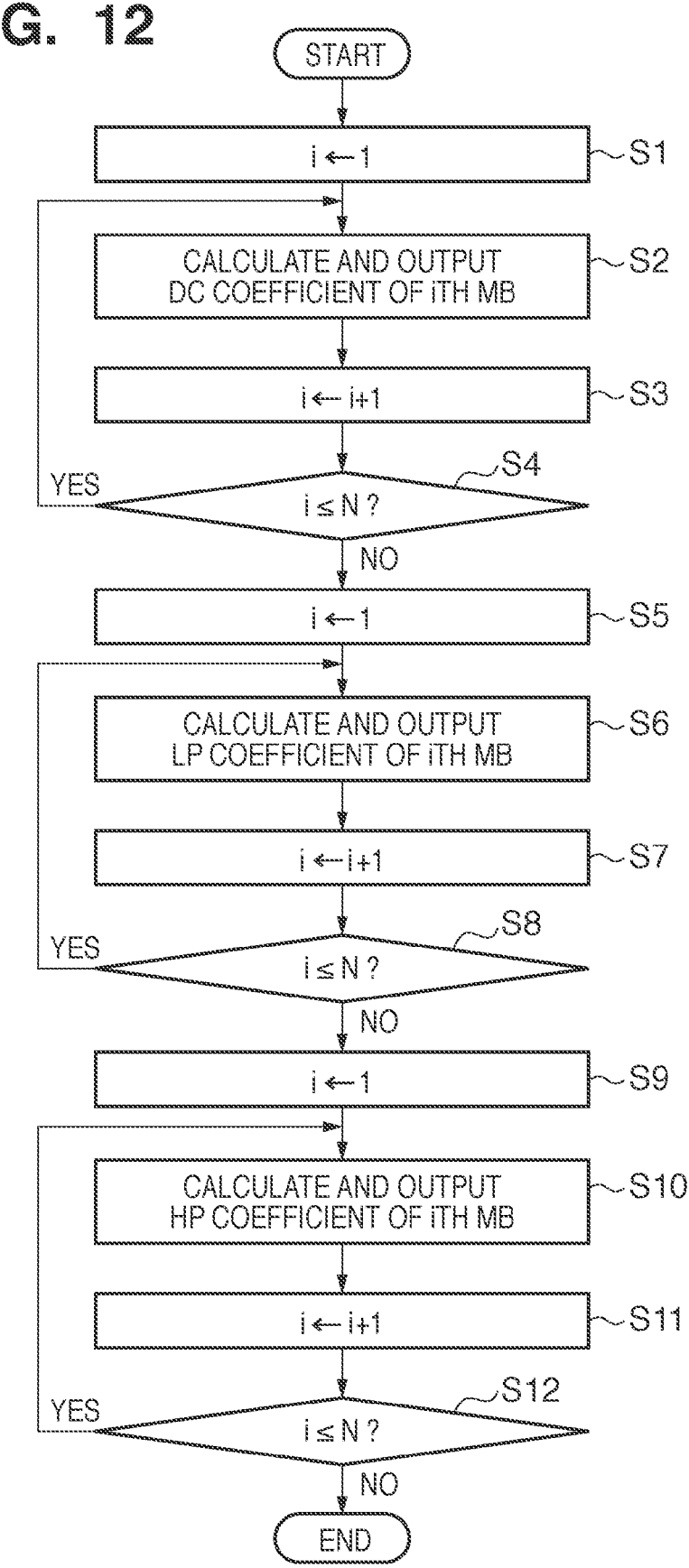
FIG. 12 is a flowchart showing orthogonal transform in the frequency mode.

Processing of step S6 in FIG. 12 is different in only step S25 in the flowchart of FIG. 13. More specifically, the data-hierarchy controller 104 suffices to issue a control signal to the second transforming unit 103 to output 15 AC components obtained upon PCT transform as LP components (discard DC components instead).

Figure 14:
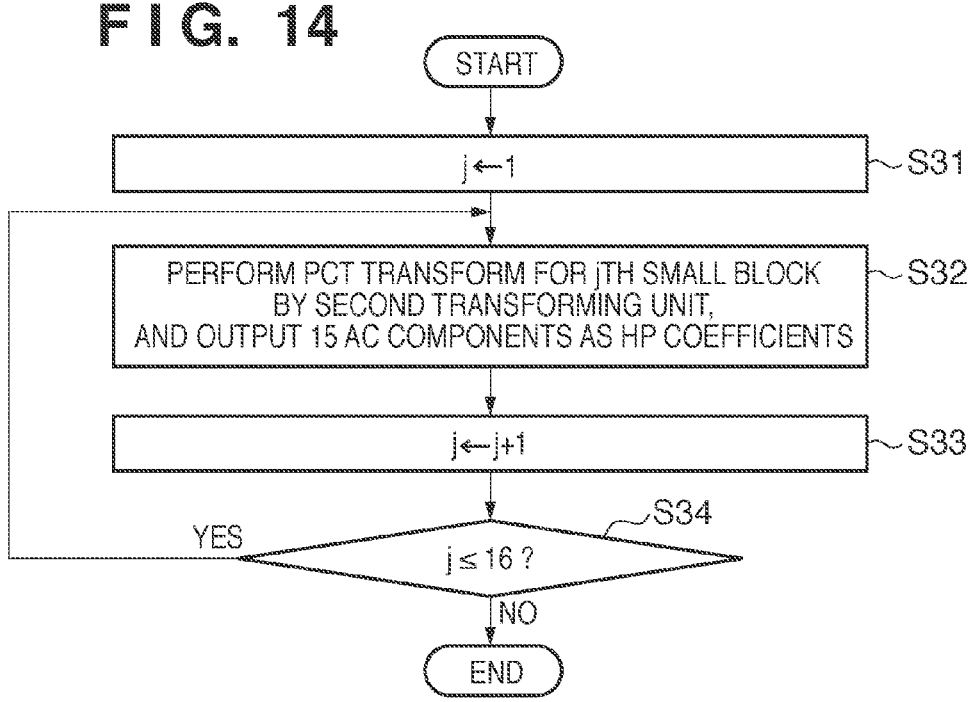
FIG. 14 is a flowchart showing processing in step S10 of FIG. 12.

Details of step S10 in FIG. 12 will be explained with reference to the flowchart of FIG. 14. First, the data-hierarchy controller 104 initializes the variable j to "1" (step S31). The variable j specifies a small block within the macroblock of interest. Assume that the data-hierarchy controller 104 sends a control signal to the selector 102 to select image data from the memory controller 105. In this manner, the data-hierarchy controller 104 supplies image data of the jth small block to the second transforming unit 103, causing the second transforming unit 103 to calculate 15 AC coefficients of the small block and output the 15 calculated AC coefficients as HP coefficients (step S32). After the end of calculation and output of the HP coefficients of one small block, the data-hierarchy controller 104 increments the variable j by only "1" (step S33). The data-hierarchy controller 104 compares the variable j with "16" by the first transforming unit 101 to determine whether calculation and output of the HP coefficients of all small blocks within the macroblock of interest by the second transforming unit 103 have ended (step S34). If NO in step S34, the data-hierarchy controller 104 repeats steps S32 to S34. If the data-hierarchy controller 104 determines that calculation and output of the HP coefficients of all small blocks within the macroblock of interest have ended, it ends the processing.

<Processing Sequence in Spatial Mode>

Figure 15:
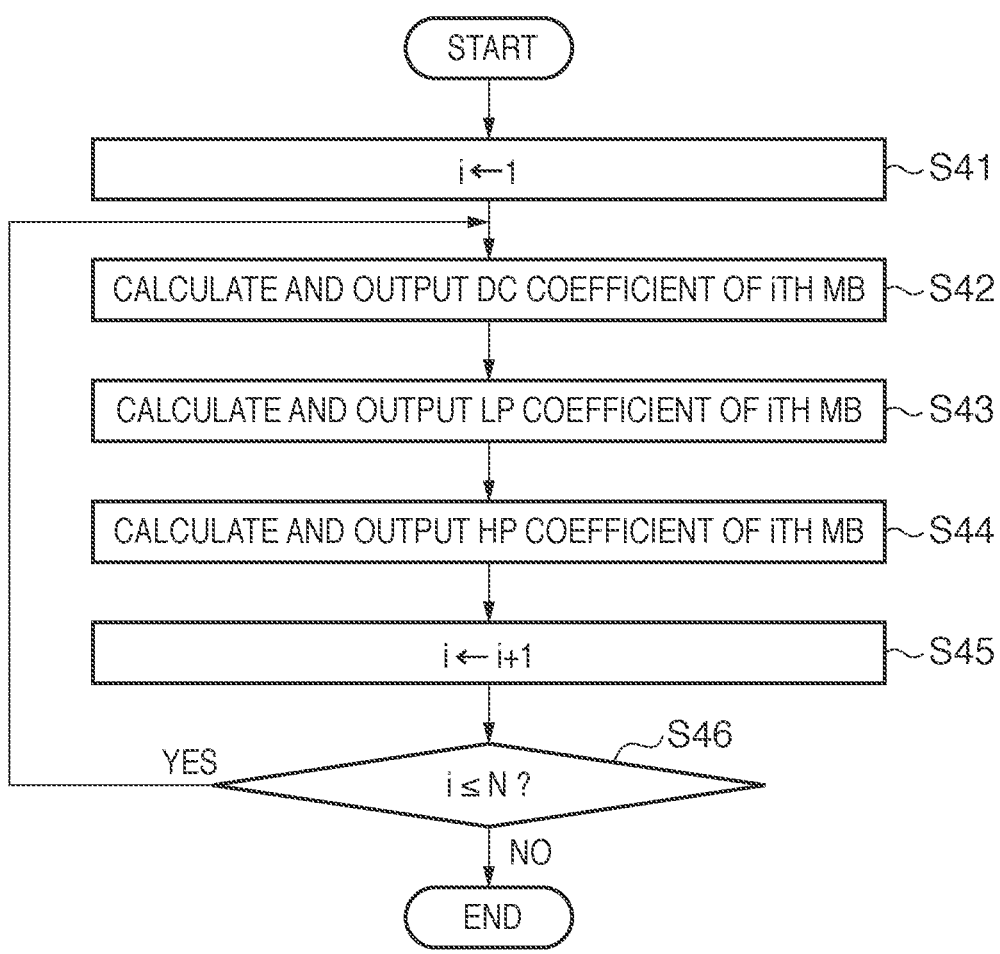
FIG. 15 is a flowchart showing orthogonal transform in the spatial mode.

Processing by the data-hierarchy controller 104 when the signal from the system controller 520 indicates the spatial mode will be explained with reference to the flowchart of FIG. 15. Also in this description, the number of macroblocks (16×16 pixels each) included in one tile is N.

First, the data-hierarchy controller 104 initializes, to "1", the variable i which specifies a macroblock (step S41). Then, the data-hierarchy controller 104 outputs a control signal to the selector 102 to select and output data from the first transforming unit 101, and outputs a control signal to the second transforming unit 103 to output only a DC coefficient obtained by PCT transform. The data-hierarchy controller 104 outputs a control signal to the memory controller 105 to read out the ith macroblock (16×16 pixels). As a result, the first transforming unit 101 calculates the DC coefficients of 4×4 small blocks within the ith macroblock, and the second transforming unit 103 calculates the DC coefficient of the macroblock from the DC coefficients of the 4×4 small blocks, and outputs the calculated DC coefficient (step S42). The data-hierarchy controller 104 outputs a control signal to the selector 102 to select and output data from the first transforming unit 101, and outputs a control signal to the second transforming unit 103 to output only an AC coefficient obtained by PCT transform. The data-hierarchy controller 104 outputs a control signal to the memory controller 105 to read out the ith macroblock. In response to this, the first transforming unit 101 calculates the DC coefficients of 4×4 small blocks within the ith macroblock, and the second transforming unit 103 calculates the AC coefficient of the macroblock from the DC coefficients of the 4×4 small blocks, and outputs the calculated AC coefficient as an LP coefficient (step S43). The data-hierarchy controller 104 outputs a control signal to the selector 102 to select and output data from the memory controller 105, and outputs a control signal to the second transforming unit 103 to output only an AC coefficient obtained by PCT transform. The data-hierarchy controller 104 outputs a control signal to the memory controller 105 to read out the ith macroblock. Hence, the second transforming unit 103 calculates an AC component from 4×4 small blocks, and outputs it as HP coefficient data (step S44).

Thereafter, the data-hierarchy controller 104 increments the variable i by only "1" (step S45), and determines whether calculation and output of the coefficients of all macroblocks within the tile of interest have ended (step S46). If NO in step S46, the data-hierarchy controller 104 repeats steps S42 to S45.

In the above processing, processing in step S42 is identical to that in step S2. Also, processing in step S43 is identical to that in step S6, and processing in step S44 is identical to that in step S10.

However, either step S42 or S43 may be omitted. This is because the DC and AC coefficients of the macroblock of interest that are obtained in PCT transform by the second transforming unit 103 in the other processing may be output sequentially.

The second and subsequent embodiments to be described later will mainly explain the frequency mode. The difference between the frequency and spatial modes is whether to output DC, LP, and HP coefficients in the order named for each tile or whether to output DC, LP, and HP coefficients in the order named for each macroblock, as shown in FIGS. 12 and 15. Those skilled in the art will readily understand the spatial mode in the second embodiment to be described later from a description of the frequency mode and the flowchart of FIG. 15, so a description of the spatial mode will be omitted.

As described above, according to the first embodiment, the DC, LP, and HP components of a macroblock can be obtained in orthogonal transform for one macroblock by a maximum of three accesses (read operations) to the image storage unit 106 per pixel. This access count can be implemented even in the frequency mode, and quick encoding processing can be achieved. Particularly, the first transforming unit 101 has an arrangement specialized in calculation of only a DC component in PCT transform. Compared to the conventional arrangement, the DC component can be calculated within a much shorter time (with a smaller number of clocks), further increasing the encoding speed.

[Second Embodiment]

Figure 10:
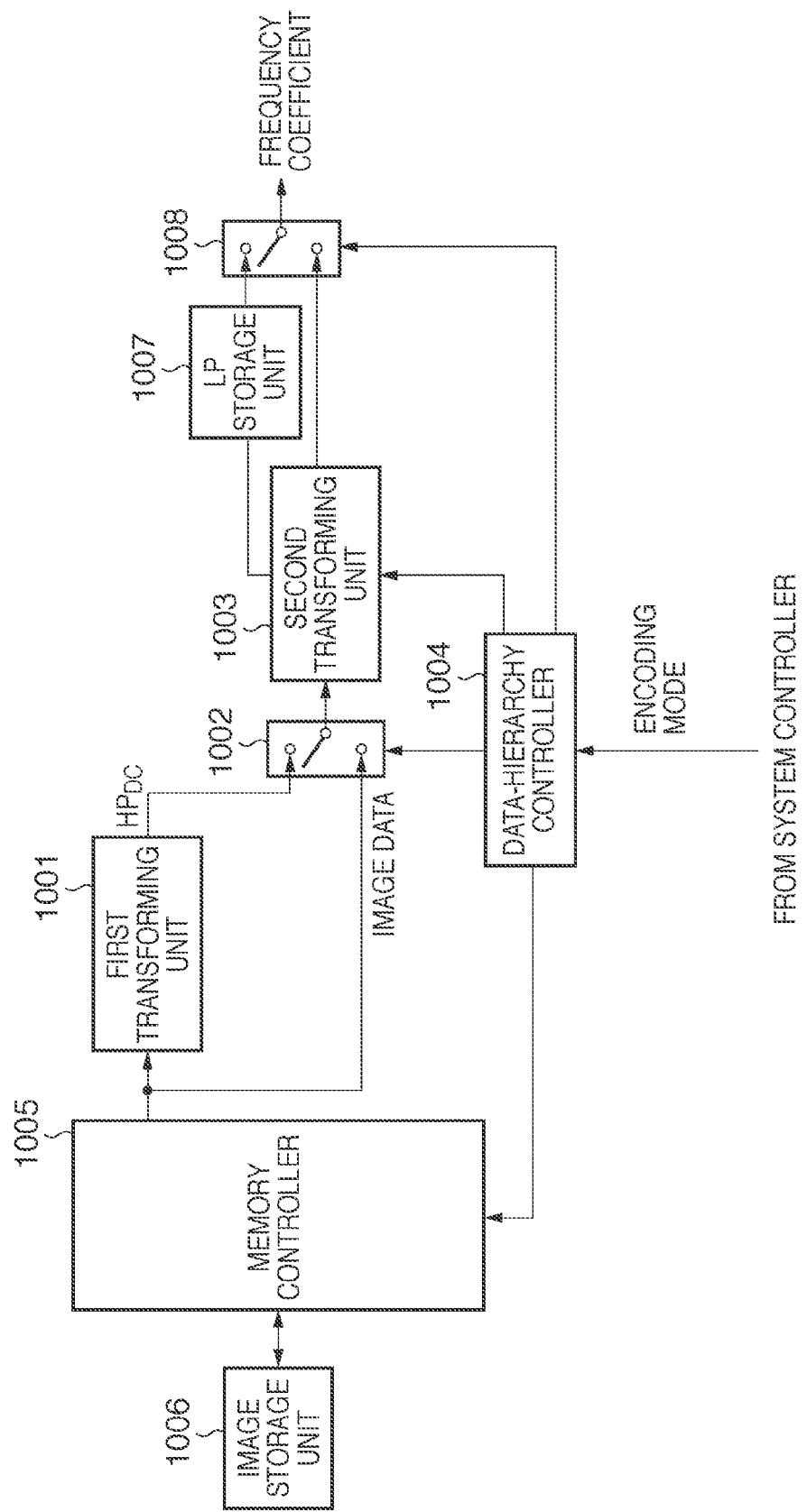
FIG. 10 is a block diagram showing an orthogonal transforming unit in the second embodiment.

The second embodiment in the present invention will be described. FIG. 10 shows the arrangement of part of an orthogonal transforming unit 901 in the second embodiment. The orthogonal transforming unit 901 in the second embodiment includes an image storage unit 1006, memory controller 1005, first transforming unit 1001, first selector 1002, second transforming unit 1003, data-hierarchy controller 1004, LP storage unit 1007, and second selector 1008.

Note that the memory controller 1005 in FIG. 10 corresponds to the memory controller 507 in FIG. 5, and the image storage unit 1006 in FIG. 10 corresponds to the memory 505 in FIG. 5.

For descriptive convenience, the difference from FIG. 1 in the first embodiment will be explained. As shown in FIG. 10, the second embodiment adopts two storage units. The first storage unit corresponds to the image storage unit 1006, and the second storage unit corresponds to the LP storage unit 1007. The image storage unit 1006 corresponds to the image storage unit 106 in FIG. 1 (memory 505 in FIG. 5). The memory controller 1005 corresponds to the memory controller 105 in FIG. 1 (memory 507 in FIG. 5). The first transforming unit 1001 corresponds to the first transforming unit 101 in FIG. 1. The first selector 1002 corresponds to the selector 102 in FIG. 1.

The second transforming unit 1003 performs PCT transform serving as lossless transform for 4×4 input data. The second transforming unit 1003 outputs the DC coefficient of a tile or a coefficient corresponding to HP to the second selector, and outputs a coefficient corresponding to LP to the LP storage unit 1007 to store it. The data-hierarchy controller 1004 corresponds to the data-hierarchy controller 104 in FIG. 1. The LP storage unit 1007 stores (15) coefficients corresponding to LP that have been output from the second transforming unit 1003. The second selector 1008 outputs either coefficient data (DC or HP) output from the second transforming unit 1003 or LP coefficients read out from the LP storage unit 1007.

An arrangement and processing sequence when encoding all coefficients from DC to HP in the second embodiment will be explained. Note that an encoding operation for encoding one MB will be described, but the same operation is also executed for the remaining MBs within the tile. For descriptive convenience, a description of the same processing units as those in FIG. 1 will not be repeated.

First, calculation of DC within a tile and the output sequence will be explained.

The first transforming unit 1001 receives a small block formed from 4×4 pixels, from an image to be encoded that has been stored in the image storage unit 1006 and read out by the memory controller 1005. The first transforming unit 1001 calculates and outputs only the DC component of the small block. To put it plainly, the first transforming unit 1001 is a part which calculates only a DC coefficient in PCT calculation. Every time the second transforming unit 1003 receives 4×4 DC components from the first transforming unit 1001 via the first selector 1002, it executes PCT calculation. The second transforming unit 1003 sends a DC component (DC coefficient) obtained by PCT calculation to the second selector 1008, and sends an AC component (LP coefficient) to the LP storage unit 1007. The second selector 1008 outputs DC acquired from the second transforming unit 1003. At this time, the data-hierarchy controller 1004 sends a control signal to the first selector 1002 so that the first selector 1002 selects and outputs data input from the first transforming unit 1001. Further, the data-hierarchy controller 1004 sends a selection signal to the second selector 1008 so that the second selector 1008 selects and outputs a DC coefficient input from the second transforming unit 1003. This operation is repeated until all the DC coefficients of all macroblocks within the tile of interest are output.

Next, calculation of an LP coefficient within a tile and the output sequence will be explained. At the same time as calculation of the DC coefficient of each macroblock, the second transforming unit 1003 calculates LP, and the LP storage unit 1007 stores the LP coefficient. Thus, at the same time as the end of outputting the DC coefficients of all macroblocks within the tile, the LP coefficients are read out from the LP storage unit 1007 and output via the second selector 1008. At this time, the data-hierarchy controller 1004 controls the second selector 1008 to select and output an LP coefficient read out from the LP storage unit 1007. This operation is repeated until all LP coefficients within the tile are output.

Calculation of an HP coefficient within a tile and the output sequence will be explained. The memory controller 1005 reads out an image to be encoded from the image storage unit 1006. The second transforming unit 1003 performs PCT calculation for the image data acquired from the memory controller 1005 via the first selector 1002. The second transforming unit 1003 sends an AC component (HP coefficient) obtained by PCT calculation to the second selector 1008, and discards the calculated DC component. At this time, the data-hierarchy controller 1004 controls the second selector 1008 to output the HP coefficient acquired from the second transforming unit 1003. This operation is repeated until all HP coefficients within the tile are output.

The arrangement and processing sequence for outputting all coefficients for each tile to generate a stream in the frequency mode in JPEG XR have been described.

In the second embodiment, for example, when encoding coefficients of all layers from DC coefficients to HP coefficients, an image to be encoded is read out twice from the image storage unit 1006. When encoding only DC coefficients, it suffices to perform only the DC coefficient processing sequence, and the read count of an image to be encoded from the image storage unit 1006 by the memory controller 1005 becomes only one. When encoding no HP coefficient, that is, when encoding only DC and LP coefficients, only the above-described DC coefficient processing sequence and LP coefficient processing sequence are executed, and the read count of an image to be encoded from the image storage unit 1006 by the memory controller 1005 becomes one.

As described above, the orthogonal transforming unit 901 in the second embodiment does not read out an image to be encoded from the image storage unit 1006 for only calculation of an LP coefficient in the frequency mode in which the coefficient prediction error of each layer is encoded for each tile. Although the memory capacity increases compared to the first embodiment, the memory band can be reduced, and processing can be done quickly.

[Third Embodiment]

Figure 3:
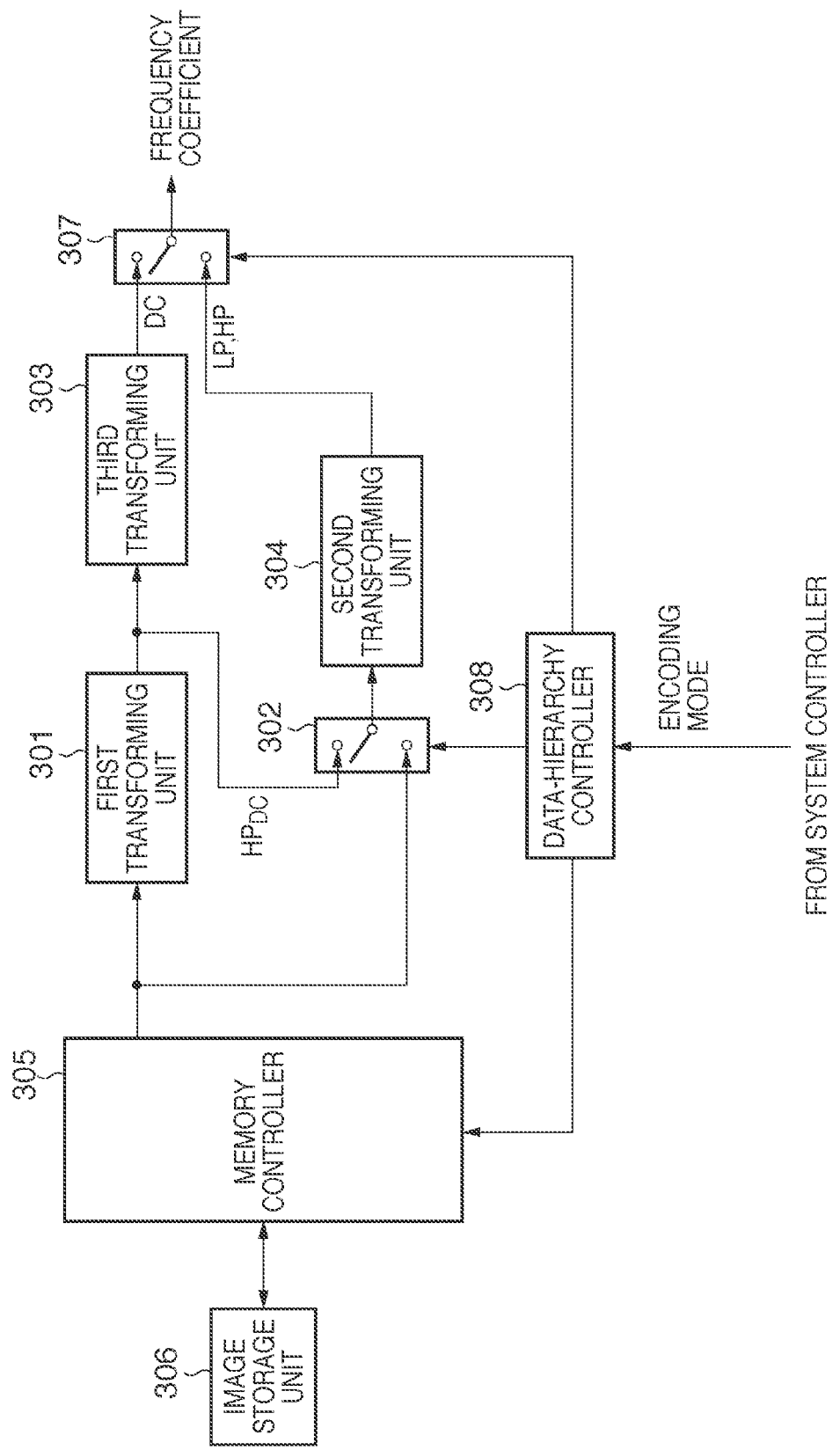
FIG. 3 is a block diagram showing an orthogonal transforming unit in the third embodiment.

The third embodiment in the present invention will be described. FIG. 3 shows the arrangement of part of an orthogonal transforming unit 901 in the third embodiment. The orthogonal transforming unit 901 in the third embodiment includes an image storage unit 306, memory controller 305, first transforming unit 301, first selector 302, second transforming unit 304, third transforming unit 303, second selector 307, and data-hierarchy controller 308.

The image storage unit 306 corresponds to the image storage unit 106 in FIG. 1. The memory controller 305 corresponds to the memory controller 105 in FIG. 1. The first transforming unit 301 corresponds to the first transforming unit 101 in FIG. 1. The first selector 302 corresponds to the selector 102 in FIG. 1. The second transforming unit 304 performs PCT serving as 4×4 lossless transform for input data, outputting an AC component. The third transforming unit 303 calculates and outputs only a DC component in PCT for input data. An arrangement regarding calculation of a DC component by the third transforming unit 303 is identical to that of the first transforming unit 301, the structure is simple, and the DC component can be calculated quickly. The second selector 307 outputs either a DC component input from the third transforming unit 303 or an AC component input from the second transforming unit 304. The data-hierarchy controller 308 controls the first selector 302 and second selector 307 in accordance with a layer to be processed. Note that the memory controller 305 corresponds to the memory controller 507 in FIG. 5, and the image storage unit 306 corresponds to the memory 505 in FIG. 5.

A processing sequence in the third embodiment will be described.

An arrangement and processing sequence when encoding all coefficients from DC coefficients to HP coefficients will be explained based on the arrangement of FIG. 5. Note that an encoding operation for encoding one MB will be described, but the same operation is also executed for the remaining MBs within the tile. For descriptive convenience, the difference from FIG. 1 in the first embodiment will be described.

First, calculation of a DC coefficient within a tile and the output sequence will be explained. The first transforming unit 301 receives a small block formed from 4×4 pixels, from the macroblock MB of interest in an image to be encoded that has been stored in the image storage unit 306 and read out by the memory controller 305. The first transforming unit 301 calculates and outputs only the DC component of the small block. The third transforming unit 303 forms a block from only the DC components of 4×4 small blocks belonging to the same MB that have been input from the first transforming unit 301. The third transforming unit 303 calculates and sends again only a DC component. Further, the second selector 307 outputs data input from the third transforming unit 303 as the "DC coefficient" of the macroblock MB. To perform this processing, the data-hierarchy controller 308 sends a selection signal to the second selector 307 so that the second selector 307 outputs a DC coefficient input from the third transforming unit 303. This operation is repeated until all the DC coefficients of all macroblocks within the tile are output.

Next, calculation of an LP coefficient within a tile and the output sequence will be explained. The first transforming unit 301 calculates and outputs only the DC components of 4×4 small blocks from an image to be encoded that has been stored in the image storage unit 306 and read out by the memory controller 305. The second transforming unit 304 forms a block from only the DC components that have been input from the first transforming unit 301 via the first selector 302. The second transforming unit 304 performs PCT calculation, outputting only an AC component. At this time, the data-hierarchy controller 308 sends a selection signal so that the first selector 302 outputs data input from the first transforming unit and the second selector 307 outputs data input from the second transforming unit 304. This operation is repeated until all LP coefficients within the tile are output.

Further, calculation of an HP coefficient within a tile and the output sequence will be explained. The memory controller 305 reads out an image to be encoded from the image storage unit 306. The second transforming unit 304 performs PCT calculation for the image data acquired from the memory controller 305 via the first selector 302. The second transforming unit 304 outputs only an AC component (HP coefficient) to the second selector 302. At this time, the data-hierarchy controller 308 sends a selection signal so that the first selector 302 outputs image data input from the memory controller 305 and the second selector 307 outputs an HP coefficient serving as data input from the second transforming unit 304. This operation is repeated until all HP coefficients within the tile are output.

The arrangement and processing sequence for outputting all coefficients for each tile to generate a stream in the frequency mode in JPEG XR have been described.

In the third embodiment, for example, when encoding all coefficients from DC coefficients to HP coefficients, an image to be encoded is read out three times. When encoding only DC coefficients, it suffices to perform only the DC coefficient processing sequence in the aforementioned processing sequence, and the read count of an image to be encoded from the image storage unit 306 by the memory controller 305 becomes only one. When encoding no HP coefficient, that is, when encoding only DC and LP coefficients, only the DC coefficient processing sequence and LP coefficient processing sequence in the above processing sequence are executed. At this time, the read count of an image to be encoded from the image storage unit 306 by the memory controller 305 becomes two. In this way, the orthogonal transforming unit in the third embodiment can efficiently, quickly calculate layer coefficients necessary for encoding in the frequency mode in which the coefficient prediction error of each layer is encoded for each tile.

[Fourth Embodiment]

Figure 11:
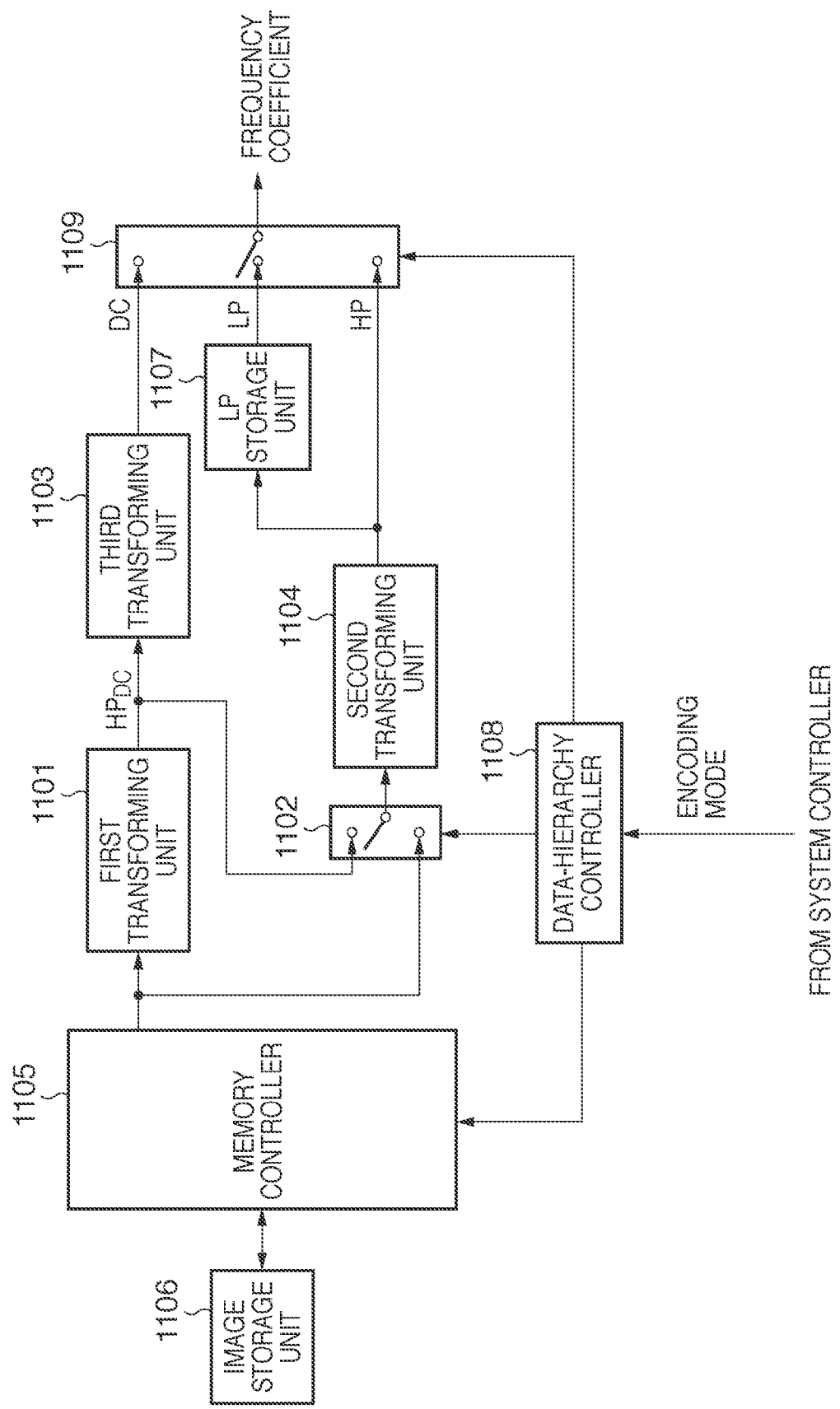
FIG. 11 is a block diagram showing an orthogonal transforming unit in the fourth embodiment.

The fourth embodiment in the present invention will be described. FIG. 11 shows the arrangement of part of an orthogonal transforming unit 901 in the fourth embodiment. The orthogonal transforming unit 901 in the fourth embodiment includes an image storage unit 1106, memory controller 1105, first transforming unit 1101, first selector 1102, second transforming unit 1104, third transforming unit 1103, second selector 1109, LP storage unit 1107, and data-hierarchy controller 1108.

Note that the memory controller 1105 in FIG. 11 corresponds to the memory controller 507 in FIG. 5, and the image storage unit 1106 in FIG. 11 corresponds to the memory 505 in FIG. 5.

The image storage unit 1106 corresponds to the image storage unit 306 in FIG. 3. The memory controller 1105 corresponds to the memory controller 305 in FIG. 3. The first transforming unit 1101 corresponds to the first transforming unit 301 in FIG. 3. The first selector 1102 corresponds to the first selector 302 in FIG. 3. The second transforming unit 1104 corresponds to the second transforming unit 304 in FIG. 3. The third transforming unit 1103 corresponds to the third transforming unit 303 in FIG. 3. The LP storage unit 1107 stores an AC component corresponding to LP that has been input from the second transforming unit 1104.

The second selector 1109 selects and outputs one of DC input from the third transforming unit 1103, LP input from the LP storage unit 1107, and HP input from the second transforming unit 1104.

The data-hierarchy controller 1108 outputs a control signal to control the first selector 1102 and second selector 1109 in synchronization with the timing of each layer to be processed. Note that the memory controller 1105 corresponds to the memory controller 507 in FIG. 5, and the image storage unit 1106 corresponds to the memory 505 in FIG. 5. A processing sequence in the fourth embodiment will be described.

Note that an encoding operation for encoding one MB will be described, but the same operation is also executed for the remaining MBs within the tile.

First, calculation of a DC coefficient within a tile and the output sequence will be explained. The first transforming unit 1101 receives a small block formed from 4×4 pixels, from the macroblock MB of interest in an image to be encoded that has been stored in the image storage unit 1106 and read out by the memory controller 1105. The first transforming unit calculates only the DC component of the small block. The first transforming unit 1101 outputs the calculated DC component of the small block to the third transforming unit 1103. The third transforming unit 1103 forms a small block from 4×4 DC components input from the first transforming unit 1101. The third transforming unit 1103 calculates and outputs again only a DC component. This DC component corresponds to the "DC coefficient" of the macroblock of interest.

The second transforming unit 1104 forms a block from DC components acquired from the first transforming unit 1101 via the first selector 1102, and performs PCT processing, outputting only an AC component. The LP storage unit 1107 stores the AC component, that is, "LP coefficient" acquired from the second transforming unit 1104. At this time, the data-hierarchy controller 1108 controls the first selector 1102 to output the DC component acquired from the first transforming unit 1101, and the second selector 1109 to output the DC coefficient acquired from the third transforming unit 1103. That is, the third transforming unit 1103 and second transforming unit 1104 parallel-execute processes. This operation is repeated until all the DC coefficients of all macroblocks within the tile are output.

Next, calculation of LP within a tile and the output sequence will be explained. The second selector 1109 outputs an LP coefficient which has been stored in the LP storage unit 1107 during the above DC coefficient calculation. Needless to say, the data-hierarchy controller 1108 sends a selection signal so that the second selector 1109 outputs the LP coefficient input from the LP storage unit. This operation is repeated until the LP coefficients of all macroblocks within the tile are output.

Further, calculation of an HP coefficient within a tile and the output sequence will be explained. The memory controller 1105 reads out an image to be encoded from the image storage unit 1106. The second transforming unit 1104 performs PCT calculation for the image data input from the memory controller 1105 via the first selector 1102. The second transforming unit 1104 outputs only an AC component (HP coefficient) obtained by PCT calculation. At this time, the data-hierarchy controller 1108 controls the first selector 1102 to output the image data input from the memory controller 1105, and the second selector 1109 to output the HP coefficient input from the second transforming unit 1104. This operation is repeated until all HP coefficients within the tile are output.

The arrangement and processing sequence for outputting coefficients of all layers for each tile to generate a stream in the frequency mode in JPEG XR have been described.

In the fourth embodiment, for example, when encoding all coefficients from DC coefficients to HP coefficients, an image to be encoded is read out twice. When encoding only DC coefficients, it suffices to perform only the DC coefficient processing sequence in the above processing sequence, and the read count of an image to be encoded from the image storage unit 1106 by the memory controller 1105 becomes only one. When encoding no HP coefficient, that is, when encoding only DC and LP coefficients, only the DC coefficient processing sequence and LP coefficient processing sequence in the above processing sequence are executed. Thus, the read count of an image to be encoded from the image storage unit 1106 by the memory controller 1105 becomes one.

As described above, the orthogonal transforming unit in the fourth embodiment can efficiently calculate layer coefficients necessary for encoding and reduce the memory band in the frequency mode in which the coefficient prediction error of each layer is encoded for each tile. Note that the third transforming unit 1103 in the fourth embodiment suffices to calculate only a DC component from 4×4 input small-block DC coefficients. The third transforming unit 1103 can therefore be implemented by the same arrangement as that of the first transforming unit 1101 (first transforming unit 101 in the first embodiment).

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

The above embodiments have described an example in which the present invention is applied to the encoder of a digital camera. However, the generation source of image data to be encoded is not limited to the image sensor and may be an uncompressed image file. Also, the output destination of encoded image data is not limited to the storage medium and may be transmitted to a network. That is, the present invention is generally applicable to an image encoding apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-093309, filed Apr. 14, 2010, which is hereby incorporated by reference herein in its entirety.

What is claimed is:

1. A data transform apparatus for orthogonally transforming a plurality of blocks of image data, the blocks represented by a preset number of pixels, to encode the image data, the apparatus comprising:
a storage unit which stores image data to be orthogonally transformed;
an access unit which reads each block from said storage unit;
a first transforming unit which receives and orthogonally transforms the block in the image data that has been stored in said storage unit and read out via said access unit, and for calculates and outputs only one direct current (DC) component;
a selection unit which selects and outputs one of: the block read out via said access unit, and data of DC components from said first transforming unit that are equal in number to pixels included in the block;
a second transforming unit which orthogonally transforms data, output from said selection unit, that are equal in number to pixels included in the block, and outputs one of: one DC component and a plurality of alternative current (AC) components; and
a control unit which controls said access unit, said selection unit, and said second transforming unit to execute one of
a first setting of causing said selection unit to select a DC component from said first transforming unit, and said second transforming unit to output one DC component obtained by orthogonal transform,
a second setting of causing said selection unit to select a DC component from said first transforming unit, and said second transforming unit to output a plurality of AC components obtained by orthogonal transform, and
a third setting of causing said selection unit to select a block of image data read via said access unit, and said second transforming unit to output a plurality of AC components obtained by orthogonal transform.

2. The apparatus according to claim 1, wherein when a macroblock is defined to contain a plurality of blocks, a tile is defined to contain a plurality of macroblocks, and an encoding mode in which a data structure of encoded data for the tile includes DC components of respective macroblocks, low-pass coefficients of the respective macroblocks, and high-pass coefficients of the respective macroblocks in the order named is selected, said control unit is configured to control to:
at a first stage, perform orthogonal transform at the first setting until DC components of all macroblocks in the tile are output,
at a second stage subsequent to the first stage, perform orthogonal transform at the second setting until low-pass coefficients of all the macroblocks in the tile are output, and
at a third stage subsequent to the second stage, perform orthogonal transform at the third setting until high-pass coefficients of all the macroblocks in the tile are output.

3. The apparatus according to claim 1, wherein
the block has a size of 4×4 pixels, and
said first transforming unit comprises
a generation unit configured to separate the block into four sub-blocks each formed from four preset coefficient data, and to generate, for each sub-block, a parity value having 0 or 1 indicating whether a sum of four coefficient data that form each sub-block is an even number or odd number,
an addition unit configured to add the parity value of each sub-block to a sum of values of pixels that form the block, and
an arithmetic unit configured to output, as a DC component of the block, an integer part obtained by dividing, by 4, a value obtained by said addition unit.

4. A data transform apparatus for orthogonally transforming each block represented by a preset number of pixels to encode image data, the apparatus comprising:
a first storage unit which stores image data to be orthogonally transformed;
an access unit which reads each block from said first storage unit;
a first transforming unit which receives and orthogonally transforms the block in the image data that has been stored in said first storage unit and read out via said access unit, and calculates and outputs only one direct current (DC) component from one block;
a first selection unit which selects and outputs one of: the block read out via said access unit, and data of DC components from said first transforming unit that are equal in number to pixels included in the block;
a second transforming unit which orthogonally transforms, output from said first selection unit, that are equal in number to pixels included in the block, and outputs one of one DC component and a plurality of alternative current (AC) components;
a second storage unit which stores the plurality of AC components obtained by said second transforming unit;
a second selection unit which selects and outputs one of: the DC component obtained by said second transforming unit, and the plurality of AC components stored in said second storage unit; and
a control unit which controls said access unit, said first selection unit, said second selection unit, and said second transforming unit to execute one of:
a first setting of causing said first selection unit to select a DC component from said first transforming unit, and said second selection unit to select and output a DC component obtained by said second transforming unit,
a second setting of causing said first selection unit to select a DC component from said first transforming unit, and said second selection unit to select and output the plurality of AC components stored in said second storage unit, and
a third setting of causing said first selection unit to select a block of image data read via said access unit, and said second selection unit to select and output the plurality of AC components calculated by said second transforming unit.

5. The apparatus according to claim 4, wherein when a macroblock is defined to contain a plurality of blocks, a tile is defined to contain a plurality of macroblocks, and an encoding mode in which a data structure of encoded data for the tile includes DC components of respective macroblocks, low-pass coefficients of the respective macroblocks, and high-pass coefficients of the respective macroblocks in the order named is selected, said control unit is configured to control to:

at a first stage, perform orthogonal transform at the first setting until DC components of all macroblocks in the tile are output, at a second stage subsequent to the first stage, perform orthogonal transform at the second setting until low-pass coefficients of all the macroblocks in the tile are output, and at a third stage subsequent to the second stage, perform orthogonal transform at the third setting until high-pass coefficients of all the macroblocks in the tile are output.

6. The apparatus according to claim 4, wherein the block has a size of 4×4 pixels, and said first transforming unit comprises:

a generation unit which separates the block into four sub-blocks each formed from four preset coefficient data, and generates, for each sub-block, a parity value having 0 or 1 indicating whether a sum of four coefficient data that form each sub-block is an even number or odd number, an addition unit which adds the parity value of each sub-block to a sum of values of pixels that form the block, and an arithmetic unit which outputs, as a DC component of the block, an integer part obtained by dividing, by 4, a value obtained by said addition unit.

7. A data transform apparatus for orthogonally transforming each block represented by a preset number of pixels to encode image data, the apparatus comprising:

a storage unit which stores image data to be orthogonally transformed;

an access unit which reads each block from said storage unit;

a first transforming unit which receives and orthogonally transforms the block in the image data that has been stored in said storage unit and read out via said access unit, and calculates and outputs only one direct current (DC) component;

a first selection unit which selects and outputs one of: the block read out via said access unit, and data of DC components from said first transforming unit that are equal in number to pixels included in the block;

a second transforming unit which orthogonally transforms data, output from said first selection unit, that are equal in number to pixels included in the block, and outputs a plurality of alternative current (AC) components;

a third transforming unit which orthogonally transforms DC components that have been output from said first transforming unit and are equal in number to pixels included in the block, and calculates and outputs only one DC component;

a second selection unit which selects and outputs one of: the DC component obtained by said third transforming unit, and the plurality of AC components obtained by said second transforming unit; and a control unit which controls said access unit, said first selection unit, and said second selection unit to execute one of:

a first setting of causing said second selection unit to select and output a DC component obtained by said third transforming unit, a second setting of causing said first selection unit to select a DC component from said first transforming unit, and said second selection unit to select and output the plurality of AC components obtained by said second transforming unit, and a third setting of causing said first selection unit to select a block of image data read via said access unit, and said second selection unit to select and output the plurality of AC components obtained by said second transforming unit.

8. The apparatus according to claim 7, wherein when a macroblock is defined to contain a plurality of blocks, a tile is defined to contain a plurality of macroblocks, and an encoding mode in which a data structure of encoded data for the tile includes DC components of respective macroblocks, low-pass coefficients of the respective macroblocks, and high-pass coefficients of the respective macroblocks in the order named is selected, said control unit is configured to control to:

at a first stage, perform orthogonal transform at the first setting until DC components of all macroblocks in the tile are output, at a second stage subsequent to the first stage, perform orthogonal transform at the second setting until low-pass coefficients of all the macroblocks in the tile are output, and at a third stage subsequent to the second stage, perform orthogonal transform at the third setting until high-pass coefficients of all the macroblocks in the tile are output.

9. The apparatus according to claim 7, wherein the block has a size of 4×4 pixels, and said first transforming unit comprises a generation unit which separates the block into four sub-blocks each formed from four preset coefficient data, and generates, for each sub-block, a parity value having 0 or 1 indicating whether a sum of four coefficient data that form each sub-block is an even number or odd number, an addition unit which adds the parity value of each sub-block to a sum of values of pixels that form the block, and an arithmetic unit which outputs, as a DC component of the block, an integer part obtained by dividing, by 4, a value obtained by said addition unit.

10. A data transform apparatus for orthogonally transforming each block represented by a preset number of pixels to encode image data, the apparatus comprising:

a first storage unit which stores image data to be orthogonally transformed;

an access unit which reads each block from said first storage unit;

a first transforming unit which receives and orthogonally transforms the block in the image data that has been stored in said first storage unit and read out via said access unit, and calculates and outputs only one direct current (DC) component from one block;

a first selection unit which selects and outputs one of: the block read out via said access unit, and DC components from said first transforming unit that are equal in number to pixels included in the block;

a second transforming unit which orthogonally transforms data, output from said first selection unit, that are equal in number to pixels included in the block, and outputs a plurality of alternative current (AC) components;

a second storage unit which stores the plurality of AC components obtained by said second transforming unit;

a third transforming unit which orthogonally transforms DC components that have been output from said first transforming unit and are equal in number to pixels included in the block, and calculates and outputs only one DC component;

a second selection unit which selects and outputs one of: the DC component obtained by said third transforming unit, the plurality of AC components stored in said second storage unit, and the plurality of AC components directly output from said second transforming unit; and a control unit which controls said access unit, said first selection unit, and said second selection unit to execute one of:

a first setting of causing said second selection unit to select and output a DC component obtained by said third transforming unit, a second setting of causing said first selection unit to select a DC component from said first transforming unit, and said second selection unit to select and output the plurality of AC components stored in said second storage unit, and a third setting of causing said first selection unit to select a block of image data read via said access unit, and said second selection unit to select and output the plurality of AC components directly output from said second transforming unit.

11. The apparatus according to claim 10, wherein when a macroblock is defined to contain a plurality of blocks, a tile is defined to contain a plurality of macroblocks, and an encoding mode in which a data structure of encoded data for the tile includes DC components of respective macroblocks, low-pass coefficients of the respective macroblocks, and high-pass coefficients of the respective macroblocks in the order named is selected, said control unit is configured to control to:

at a first stage, perform orthogonal transform at the first setting until DC components of all macroblocks in the tile are output, at a second stage subsequent to the first stage, perform orthogonal transform at the second setting until low-pass coefficients of all the macroblocks in the tile are output, and at a third stage subsequent to the second stage, perform orthogonal transform at the third setting until high-pass coefficients of all the macroblocks in the tile are output.

12. The apparatus according to claim 10, wherein the block has a size of 4×4 pixels, and said first transforming unit comprises a generation unit which separates the block into four sub-blocks each formed from four preset coefficient data, and generates, for each sub-block, a parity value having 0 or 1 indicating whether a sum of four coefficient data that form each sub-block is an even number or odd number, an addition unit which adds the parity value of each sub-block to a sum of values of pixels that form the block, and an arithmetic unit which outputs, as a DC component of the block, an integer part obtained by dividing, by 4, a value obtained by said addition unit.

13. A method of orthogonal transformation of a plurality of blocks of image data, the blocks represented by a preset number of pixels, to encode the image data, the method comprising:

a storing step of storing image data to be orthogonally transformed;

a reading step of reading each block of the stored image data;

a first transforming step of receiving and orthogonally transforming each read block, and calculating and outputting only one direct current (DC) component for each block;

a selecting step of selecting and outputting one of: the read block, and data of outputted DC components that are equal in number to pixels included in the block;

a second transforming step of orthogonally transforming the data output of the selecting step that are equal in number to pixels included in the block, and outputting one of: one DC component and a plurality of alternative current (AC) components; and a control step of controlling the reading step, the selecting step and the second transforming step to execute one of:

a first setting of causing the selecting step to select a DC component, and the second transforming step to output one DC component obtained by orthogonal transform, a second setting of causing the selecting step to select a DC component, and the second transforming step to output a plurality of AC components obtained by orthogonal transform, and a third setting of causing the selecting step to select a block of image data read in the reading step, and the second transforming step to output a plurality of AC components obtained by orthogonal transform.

14. A method of orthogonal transformation of a plurality of blocks of image data, the blocks represented by a preset number of pixels, to encode the image data, the method comprising:

a first storing step of storing image data to be orthogonally transformed;

a reading step of reading each block of the stored image data;

a first transforming step of receiving and orthogonally transforming each read block, and calculating and outputting only one direct current (DC) component for each block;

a first selecting step of selecting and outputting one of: the read block, and data of DC components outputted in the first transforming step that are equal in number to pixels included in the block;

a second transforming step of orthogonally transforming the data output from the first selecting step that are equal in number to pixels included in the block, and outputting one of: one DC component and a plurality of alternative current (AC) components;

a second storing step of storing the plurality of AC components obtained by the second transforming step;

a second selecting step of selecting and outputting one of: the DC component obtained in the second transforming step, and the plurality of AC components stored in the second storing step; and a control step of controlling the reading step, the first selecting step, the second selecting step, and the second transforming step to execute one of:

a first setting of causing the first selecting step to select a DC component outputted in the first transforming step, and the second selecting step to select and output a DC component obtained by the second transforming step, a second setting of causing the first selecting step to select a DC component outputted in the first transforming step, and the second selecting step to select and output the plurality of AC components stored in the second storing step, and a third setting of causing the first selecting step to select a block of image data read in the reading step, and the second selecting step to select and output the plurality of AC components calculated in the second transforming step.

15. A method of orthogonal transformation of a plurality of blocks of image data, the blocks represented by a preset number of pixels, to encode the image data, the method comprising:

a storing step of storing image data to be orthogonally transformed;

a reading step of reading each block of the stored image data;

a first transforming step of receiving and orthogonally transforming each read block, and calculating and outputting only one direct current (DC) component for each block;

a first selecting step of selecting and outputting one of: the read block, and data of DC components outputted in the first transforming step that are equal in number to pixels included in the block;

a second transforming step of orthogonally transforming the data output from the first selecting step that are equal in number to pixels included in the block, and outputting a plurality of alternative current (AC) components;

a third transforming step of orthogonally transforming DC components outputted in the first transforming step that are equal in number to pixels included in the block, and calculating and outputting only one DC component;

a second selecting step of selecting and outputting one of: the DC component obtained in the third transforming step, and the plurality of AC components outputted in the second transforming step; and a control step of controlling the reading step, the first selecting step, and the second selecting step to execute one of:

a first setting of causing the second selecting step to select and output a DC component outputted in the third transforming step, a second setting of causing the first selecting step to select a DC component outputted in the first transforming step, and the second selecting step to select and output the plurality of AC components outputted in the second transforming step, and a third setting of causing the first selecting step to select a block of image data read in the reading step, and the second selecting step to select and output the plurality of AC components outputted in the second transforming step.

16. A method of orthogonal transformation of a plurality of blocks of image data, the blocks represented by a preset number of pixels, to encode the image data, the method comprising:

a first storing step of storing image data to be orthogonally transformed;

a reading step of reading each block of the stored image data;

a first transforming step of receiving and orthogonally transforming each read block, and calculating and outputting only one direct current (DC) component for each block;

a first selecting step of selecting and outputting one of: the read block, and data of DC components outputted in the first transforming step that are equal in number to pixels included in the block;

a second transforming step of orthogonally transforming data output from the first selecting step that are equal in number to pixels included in the block, and outputting a plurality of alternative current (AC) components;

a second storing step of storing the plurality of AC components obtained by the second transforming step;

a third transforming step of orthogonally transforming DC components outputted in the first transforming step that are equal in number to pixels included in the block, and of calculating and outputting only one DC component;

a second selecting step of selecting and outputting one of: the DC component obtained in the third transforming step, the plurality of AC components stored in the second storing step, and the plurality of AC components directly output in the second transforming step; and a control step of controlling the reading step, the first selecting step, and the second selecting step to execute one of:

a first setting of causing the second selecting step to select and output a DC component outputted in the third transforming step, a second setting of causing the first selecting step to select a DC component outputted in the first transforming step, and the second selecting step to select and output the plurality of AC components stored in the second storing step, and a third setting of causing the first selecting step to select a block of image data read in the reading step, and the second selecting step to select and output the plurality of AC components directly outputted in the second transforming step.

* * * * *